(12) United States Patent
Lim

(10) Patent No.: US 11,420,127 B2
(45) Date of Patent: Aug. 23, 2022

(54) DEVICE AND METHOD FOR RECORDING GAME RESULT BY CONDUCTING GAME AMONG PLURALITY OF USERS, AND COMPUTER PROGRAM

(71) Applicant: NEXON KOREA CORPORATION, Seongnam-si (KR)

(72) Inventor: Tae Hyun Lim, Seoul (KR)

(73) Assignee: NEXON KOREA CORPORATION, Seongnam-si (KR)

( * ) Notice: Subject to any disclaimer, the term of this patent is extended or adjusted under 35 U.S.C. 154(b) by 11 days.

(21) Appl. No.: 17/046,513

(22) PCT Filed: Apr. 13, 2018

(86) PCT No.: PCT/KR2018/004310
§ 371 (c)(1),
(2) Date: Oct. 9, 2020

(87) PCT Pub. No.: WO2019/198845
PCT Pub. Date: Oct. 17, 2019

(65) Prior Publication Data
US 2021/0106920 A1      Apr. 15, 2021

(30) Foreign Application Priority Data
Apr. 12, 2018 (KR) ........................ 10-2018-0042918

(51) Int. Cl.
*A63F 13/79* (2014.01)
*A63F 13/35* (2014.01)
*A63F 13/86* (2014.01)

(52) U.S. Cl.
CPC .............. *A63F 13/79* (2014.09); *A63F 13/35* (2014.09); *A63F 13/86* (2014.09)

(58) Field of Classification Search
CPC ........... A63F 13/79; A63F 13/35; A63F 13/86
See application file for complete search history.

(56) References Cited

U.S. PATENT DOCUMENTS

2013/0059656 A1    3/2013  Kim et al.
2017/0031874 A1    2/2017  Boudville
(Continued)

FOREIGN PATENT DOCUMENTS

WO      2017-066002 A1    4/2017

OTHER PUBLICATIONS

International Search Report and Written Opinion mailed in International Patent Application No. PCT/KR2018/004310, filed Apr. 13, 2018, 11 pages.

(Continued)

*Primary Examiner* — Omkar A Deodhar
*Assistant Examiner* — Shauna-Kay Hall
(74) *Attorney, Agent, or Firm* — Kilpatrick Townsend & Stockton LLP

(57) ABSTRACT

A method of playing a game between a plurality of users and recording a game result thereof includes: registering the plurality of users including a first user and a second user in a blockchain network; performing, by the first user and the second user, a game according to execution of a first game application; obtaining, from the first game application, first game result information as a game result the game played between the first user and the second user; and updating game history information of the blockchain network based on the first game result information.

18 Claims, 20 Drawing Sheets

(56) References Cited

U.S. PATENT DOCUMENTS

| | | |
|---|---|---|
| 2018/0096752 A1 | 4/2018 | Ovalle |
| 2018/0114403 A1* | 4/2018 | Jayachandran ....... H04L 9/3297 |
| 2019/0028246 A1* | 1/2019 | Au ........................ H04L 5/0007 |
| 2019/0028264 A1* | 1/2019 | Bisti ..................... G06F 21/645 |
| 2019/0282906 A1* | 9/2019 | Yong ...................... A63F 13/69 |

OTHER PUBLICATIONS

Segev, R., "Why blockchain is a game-changer for the igaming industry" IGB, Oct. 3, 2017, retrieved on Jan. 8, 2019 from <URL: https://www.igamingbusiness.com/why-blockchain-game-changer-igaming-industry>, 5 pages.

* cited by examiner

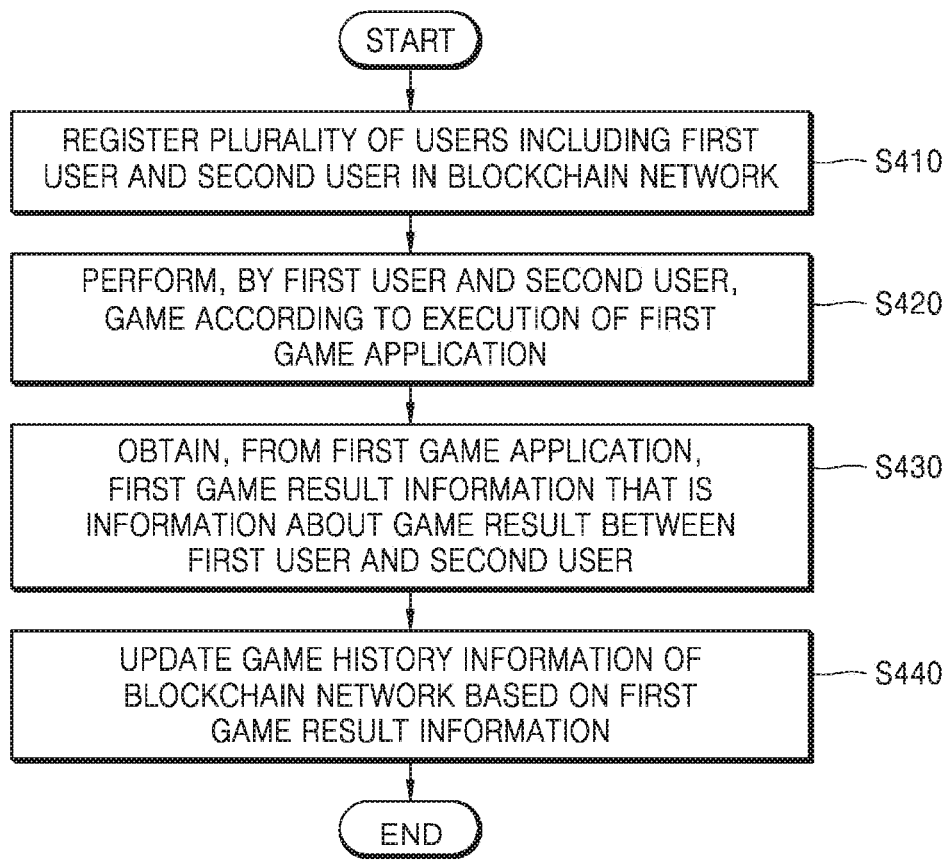

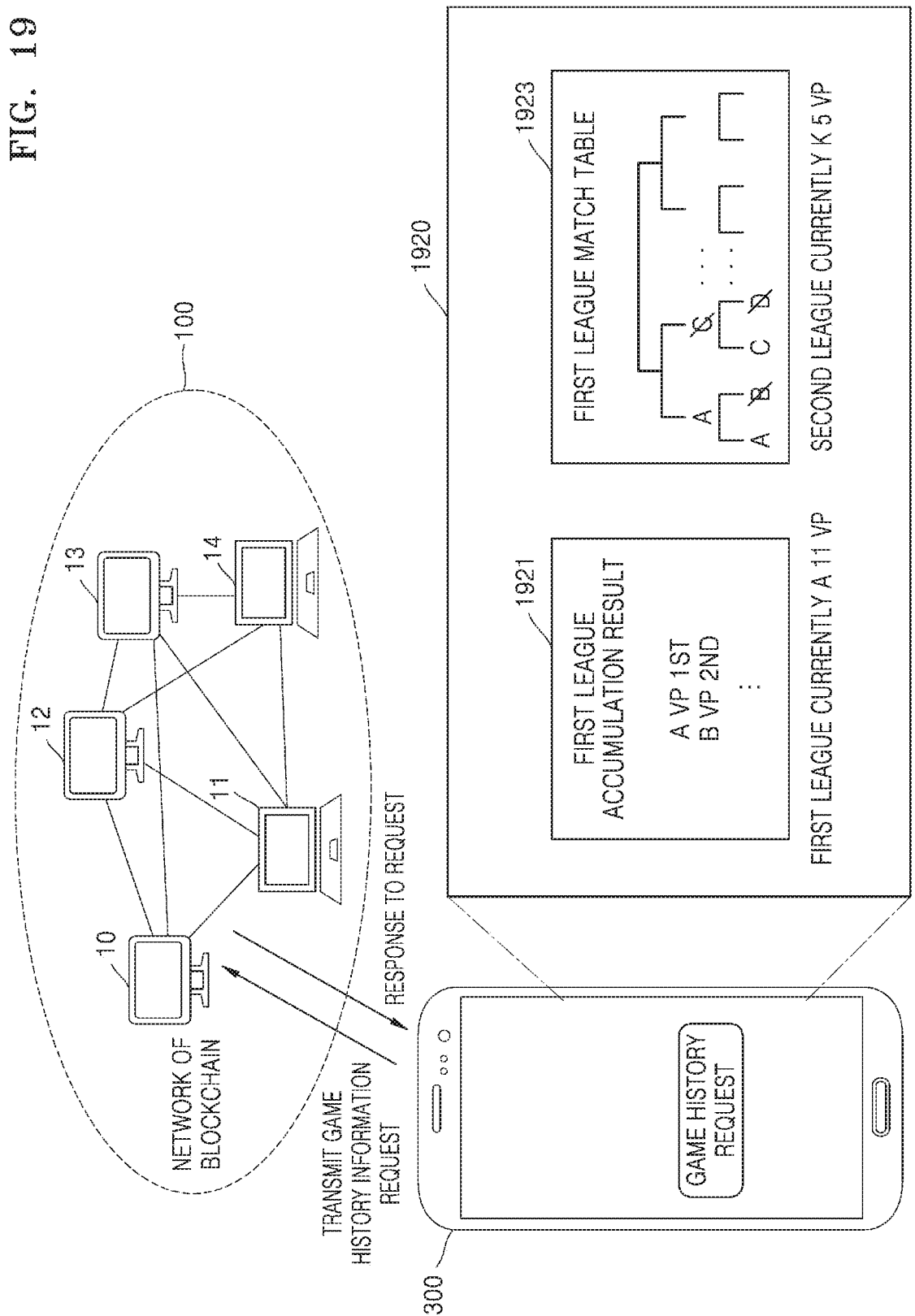

DEVICE AND METHOD FOR RECORDING GAME RESULT BY CONDUCTING GAME AMONG PLURALITY OF USERS, AND COMPUTER PROGRAM

TECHNICAL FIELD

The present disclosure relates to an apparatus, a method, and a computer program for recording a game result of a game played between a plurality of users, and more particularly, to an apparatus, a method, and a computer program for playing a game between a plurality of users and recording a game result thereof by using a blockchain network.

BACKGROUND ART

In the case where users enjoy sports games or the like online, there is a case where a game is played between a small number of users, but there is also a case where users belonging to a particular group play a game while competing for ranking among a plurality of users. Also, there is a case where an online game is played in a tournament or league format between teams of multiple users.

In such a game of determining the ranking of a plurality of users, there is a need to enhance security so that game information stored on a system for playing the game may not be manipulated by the users.

DESCRIPTION OF EMBODIMENTS

Technical Problem

The present disclosure is to improve the reliability of game play by storing game information between users and determining the ranking of a league game by using a blockchain network.

The present disclosure is to store game information between users and easily share the same between the users by using a blockchain network.

The present disclosure is to easily reward users for a game result after the end of a game by storing game information between the users and calculating the ranking among the users by using a blockchain network.

Solution to Problem

As a technical means for achieving the above technical objects, a method of recording a game result of a game played between a plurality of users includes: registering the plurality of users including a first user and a second user in a blockchain network; performing, by the first user and the second user, a game according to execution of a first game application; obtaining, from the first game application, first game result information as a game result of the game played between the first user and the second user; and updating game history information of the blockchain network based on the first game result information.

According to an embodiment, the method may further include updating a match table of league games by using the game history information of the blockchain network.

According to an embodiment, the method may further include assigning the plurality of registered users in a plurality of league games based on information about the plurality of users registered in the blockchain network before the performing of the game.

According to an embodiment, the method may further include rewarding a cryptocurrency corresponding to a victory point (VP) acquired in the game to the first user based on at least one of the first game result information and the game history information.

According to an embodiment, the updating of the game history information based on the first game result information by using the blockchain may include: requesting a first node on a network of the blockchain to record the first game result information in a block constituting the blockchain for verification of the first game result information; and updating the game history information based on the first game result information by receiving a message indicating that the first game result information has been verified from the network of the blockchain.

According to an embodiment, the requesting of the first node to record the first game result information may include encrypting the first game result information and transmitting the encrypted first game result information to the first node.

According to an embodiment, the transmitting of the first game result information to the first node may include: generating a first hash value corresponding to first transaction information by applying the first game result information to a hash function for generating unique data about the first game result information; generating a first cryptogram representing a digital signature of the first game result information by encrypting the first hash value with a private key of the first user; and transmitting the first cryptogram with the first game result information to the first node.

According to an embodiment, the updating of game history information based on the first game result information may include transmitting the first game result information to a plurality of nodes in the blockchain.

According to an embodiment, the obtaining of the first game result information as the game result of the game played between the first user and the second user may include receiving a confirmation of the first user and a confirmation of the second user with respect to the first game result information.

According to an embodiment, the first game result information may include at least one of address information of a first account of the first user, address information of a second account of the second user, a victory point acquired by the first user in the game, a victory point acquired by the second user in the game, game play time information of the game, and information proving whether the result of the game is confirmed.

According to an embodiment, the method may further include displaying at least one of the first game result information, and the game history information updated based on the first game result information, in response to an input for requesting the game result.

According to an embodiment, the method may further include controlling to store a program code of a smart contract in the blockchain network for organizing a plurality of leagues according to levels of the plurality of users and rewarding a winner of a league.

As a technical means for achieving the above technical objects, an apparatus of recording a game result of a game played between a plurality of users includes: a communicator; a memory storing one or more instructions; and a processor configured to execute the one or more instructions stored in the memory.

According to an embodiment, the processor may execute the one or more instructions to: register the plurality of users including a first user and a second user in a blockchain network; perform, by the first user and the second user, a game according to execution of a first game application; obtain, from the first game application, first game result information as a game result of the game played between the first user and the second user; and update game history information of the blockchain network based on the first game result information.

As a technical means for achieving the above technical objects, a program is stored in a non-transitory computer-readable recording medium to, when executed by a computer, perform the above method of playing a game between a plurality of users and recording a game result thereof.

Advantageous Effects of Disclosure

According to the present disclosure, the reliability of game play may be improved by storing the game information between the users and determining the ranking of a league game by using the blockchain network.

According to the present disclosure, the game information between users may be stored and easily shared between the users by using the blockchain network.

According to the present disclosure, the users may be easily rewarded for the game result after the end of the game by storing the game information between the users and calculating the ranking among the users by using the blockchain network.

BRIEF DESCRIPTION OF DRAWINGS

The present disclosure may be easily understood through the following detailed description and the accompanying drawings, in which reference numerals refer to structural elements.

FIG. 4 is a flowchart of a method of providing a game service according to an embodiment.

FIG. 19 is a diagram for describing that a game service providing apparatus provides game information at a user's request.

MODE OF DISCLOSURE

Figure 1:
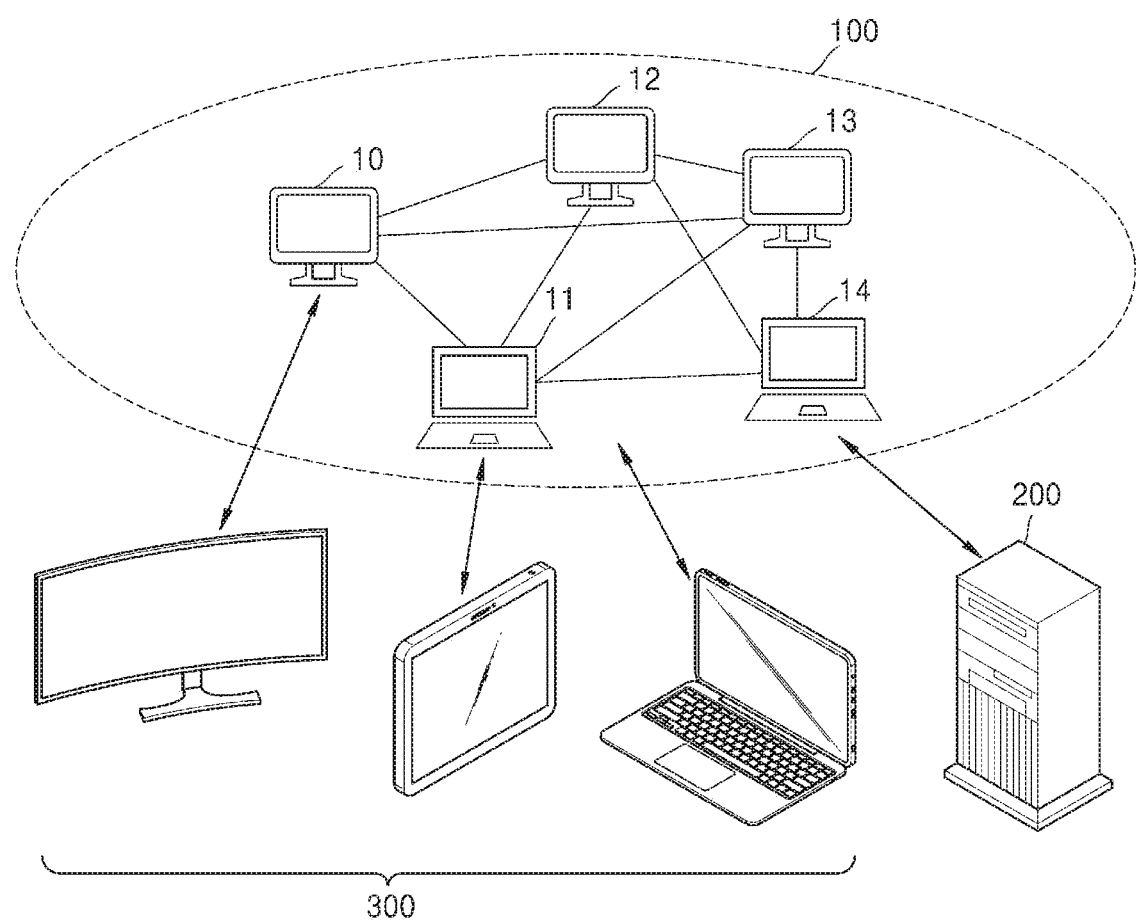
FIG. 1 illustrates an online game providing system including a blockchain network, a game service providing apparatus, and at least one user device according to an embodiment.

Hereinafter, example embodiments according to the present disclosure will be described in detail with reference to the accompanying drawings. Also, a method of configuring and using an electronic apparatus according to an embodiment of the present disclosure will be described in detail with reference to the accompanying drawings. In the drawings, like reference numerals or symbols may denote like parts or components that perform substantially the same function.

Although terms such as "first" and "second" may be used herein to describe various components, the components should not be limited by the terms. These terms are only used to distinguish one component from another component. For example, a first component may also be referred to as a second component, and vice versa. As used herein, the term "and/or" includes any and all combinations of one or more of the associated listed items.

The terms used herein are used to describe embodiments and are not intended to limit and/or restrict the present disclosure. As used herein, the singular forms "a", "an", and "the" are intended to include the plural forms as well, unless the context clearly indicates otherwise. It will be understood that terms such as "comprise," "include," and "have", when used herein, specify the presence of stated features, integers, steps, operations, elements, components, or combinations thereof, but do not preclude the presence or addition of one or more other features, integers, steps, operations, elements, components, or combinations thereof.

Throughout the specification, when an element is referred to as being "connected" to another element, it may be "directly connected" to the other element or may be "electrically connected" to the other element with one or more intervening elements therebetween. Also, when something is referred to as "including" a component, another component may be further included unless specified otherwise. Also, as used herein, the terms "units" and "modules" may refer to units that perform at least one function or operation, and the units may be implemented as hardware or software or a combination of hardware and software.

Hereinafter, "game statistic information" may refers to information obtained by analyzing in-game data by various criteria during a certain period for a certain game. For example, the game statistic information may be obtained by analyzing user information in the game. The user information may include at least one of game access information, play performance, attack point information, growth information, used item information, possessed item information, level information, completed achievement information, achieved quest information, skill level information, operation ability information, friend information, and guild information. Also, it may be obtained by interpreting a lot of data such as a group to which a user's character belongs, personal skill, speed, damage, stamina, attack participation level, defense participation level, accumulated goods quantity, user's accumulated game time, and used item type and class.

Hereinafter, "user" may refer to a gamer, and the user may include a service provider providing a game for playing and a user playing a game league. However, the present disclosure is not limited thereto.

Herein, "electronic wallet" may refer to a means for electronically storing values in electronic apparatuses to enable transactions online or offline without exchanging real money. Also, the "electronic wallet" may be a type of electronic payment system used in electronic commerce and may refer to software for storing money values in virtual accounts or memories of electronic apparatuses to be used as a wallet to pay prices in electronic commerce.

Herein, "cryptocurrency" may refer to digital currency designed to function as an exchange means by using an encryption method. Also, the "cryptocurrency" may use an encryption method to secure transaction security, control generation of additional units, and authenticate transfer of assets.

Herein, "game cash" may refer to digital currency designed to function as an exchange means in the game.

Herein, "blockchain" may refer to a distributed peer-to-peer (P2P) system of a ledger using a software element including an algorithm in which blocks connected in order to secure and maintain integrity negotiate transaction information by using an encryption technique and security technology. Here, the distributed P2P system may be a special form of the distributed system. Also, in a P2P system, all nodes of a network may provide resources (e.g., processing power, storage space, and data or network bandwidth) to each other without coordination of a central node. Also, the "blockchain" may refer to a distributed ledger technology in which the ledger recording transaction information is distributed in a P2P network rather than in a central server of a particular institution and is commonly recorded and managed by the nodes in the network.

Herein, "electronic apparatus" may refer to an apparatus that operates by receiving electrical energy. For example, the "electronic apparatus" may be a smart phone, a tablet personal computer (PC), a PC, a television (TV), a smart TV, a mobile phone, a personal digital assistant (PDA), a laptop, or a non-mobile computing apparatus; however, the present disclosure is not limited thereto.

Herein, "node" may refer to a component in a network of a blockchain, and "peer" may be used in the same sense as the "node". For example, the "node" may be a special-purpose computer, a general-purpose computer, a supercomputer, a mainframe computer, a personal computer (PC), a smart phone, or a tablet PC; however, the present disclosure is not limited thereto.

FIG. 1 illustrates an online game providing system 1 including a blockchain network 100, a game service providing apparatus 200, and at least one user device 300 according to an embodiment.

The online game providing system 1 of the present disclosure may include a blockchain network 100, a game service providing apparatus 200, and at least one user device 300.

The blockchain network 100 may include a plurality of nodes 10, 11, 12, 13, and 14, which may be connected to each other to distribute and manage data. For example, the blockchain network 100 may store data used to provide a service in the game service providing apparatus 200, contents of smart contracts, transactions, game results, user information, or the like. The game service providing apparatus 200 and the user device 300 may request and obtain various data stored in the blockchain network 100.

Smart contracts, transactions, or the like uploaded to the blockchain network 100 may not be easily forged because the plurality of nodes 10, 11, 12, 13, and 14 are connected to store data.

The blockchain network 100, for example, may organize a plurality of leagues according to the level of a plurality of users and store a program code of a smart contract for paying a certain prize to a winner in each league. The smart contract may be, for example, respectively receiving 100, 50, and 30 caches from the game organizer in descending order of the victory points of users at the end of the game.

The blockchain network 100 may store, for example, a transaction including information about the game result between users in the league.

The blockchain network 100 may be implemented as a private blockchain or may be implemented as a public blockchain. Because the private blockchain is a blockchain in which only predetermined authorized nodes participate, it may have the advantage of high speed and low risk of forgery.

According to an embodiment, the game service providing apparatus 200 may include a personal computer, a cloud server, or the like and may correspond to one component in the network of the blockchain.

The game service providing apparatus 200 may provide an online game-related service through the network. The game service providing apparatus 200 may simultaneously provide the at least one user device 300 with a function of recording the result of playing an online game to determine the ranking thereof or to pay a reward according to the game result. The online game may mean a game enjoyed by a plurality of users accessing the network.

According to an embodiment, the online game providing system 1 may include a server of a game service provider and a separate database. According to an embodiment, the database may store and manage information about the user playing the game. According to an embodiment, the database may store user information, for example, at least one of game access information, play performance, attack point information, used item information, possessed item information, level information, friend information, and guild information. According to an embodiment, the separate database may be included in the blockchain network 100.

The at least one user device 300 may be an electronic device capable of installing and driving the game and may be a device capable of communicating with the game service providing apparatus 200 through the network. The at least one user device 300 may include various electronic devices such as personal digital assistants (PDAs), portable multimedia players (PMPs), navigations, MP3 players, digital cameras, refrigerators, washing machines, or cleaners, as well as personal computers, tablets, notebooks, smart phones, or TVs. Also, the at least one user device 300 is not limited thereto and may include a wearable device having a communication function and a data processing function.

The at least one user device 300 may receive a game service through the game service providing apparatus 200 by using the network. The meaning of receiving a game system by using the network may include the meaning that communication between a game server and a terminal may be performed through various communication methods.

According to an embodiment, the network may mean a connection established (or formed) by using a certain communication method and may mean a communication network for transmitting and receiving data between a terminal and a terminal or between a terminal and a server.

The communication method may include a communication method such as communication through a certain communication standard, a certain frequency band, a certain protocol, or a certain channel. For example, the communication method may include Bluetooth, BLE, Wi-Fi, ZigBee, 3G, LTE, a communication method through ultrasound, or the like and may include short-range communication, long-range communication, wireless communication, and wired communication. However, the present disclosure is not limited thereto.

According to an embodiment, the short-range communication method may mean a communication method in which communication is possible only when a device (terminal or server) performing communication is within a certain range, and may include, for example, Bluetooth, NFC, or the like. The long-range communication method may mean a communication method in which a device performing communication may communicate regardless of the distance. For example, the long-range communication method may mean a method in which two devices performing communication through a repeater such as an AP may communicate even when spaced apart from each other by a certain distance or more, and may include a cellular network (3G or LTE) such as SMS and telephone. However, the present disclosure is not limited thereto.

According to an embodiment, the online game may include various genres such as sports, MMORPG, AOS, FPS, TCG, and CCG. Also, the online game may be a game of a user-to-user match method or may be a game of a user-to-computer (e.g., artificial intelligence) match method. However, the present disclosure is not limited thereto and there is no limit to the type of the online game.

Figure 2:
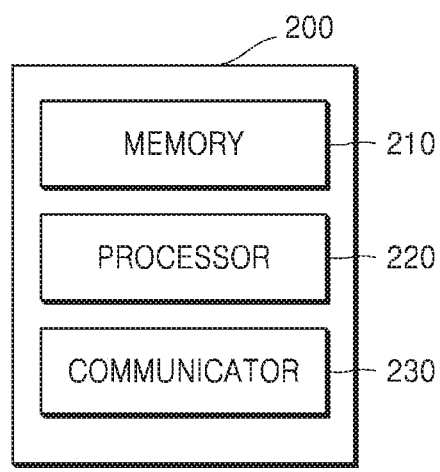
FIG. 2 is a diagram for describing a game service providing apparatus according to an embodiment.

FIG. 2 is a diagram for describing a game service providing apparatus 200 according to an embodiment.

The game service providing apparatus 200 may be a server apparatus that supports a function of a plurality of users playing a game online together. The user may provide the game result to the blockchain network 100 directly or through the game service providing apparatus 200.

Also, the game service providing apparatus 200 may correspond to one node on the blockchain network 100 for executing a program or application that allows a plurality of users to play a game together and records the game result thereof to determine the ranking thereof or to pay a reward according to the game result.

The game service providing apparatus 200 may include a memory 210, a processor 220, and a communicator 230.

According to an embodiment, the memory 210 may store various data, programs, or applications for driving and controlling the game service providing apparatus 200. The program stored in the memory 210 may include one or more instructions. The application or program (one or more instructions) stored in the memory 210 may be executed by the processor 220.

The processor 220 may control an overall operation of the game service providing apparatus 200. For example, the processor 220 may control an operation of the game service providing apparatus 200 by executing the program stored in the memory 210 of the game service providing apparatus 200.

The processor 220 may perform a function of recording the game result to determine the ranking thereof or to pay a reward according to the game result. Here, the function performed by the processor 220 may be performed by executing the program code stored in the game service providing apparatus 200. The program code stored in the game service providing apparatus 200 may be updated by the manufacturer thereof.

According to an embodiment, the processor 220 may execute one or more programs or instructions stored in the memory 210. The processor 220 may include a single core, a dual core, a triple core, a quad core, or any multiple core thereof. Also, the processor 220 may include a plurality of processors.

According to an embodiment, the processor 220 may register a plurality of users including a first user and a second user in the blockchain network by executing one or more instructions.

Also, according to an embodiment, the processor 220 may perform, by the first user and the second user, a game according to the execution of a first game application and store first game result information that is the game result between the first user and the second user from the first game application.

According to an embodiment, the processor 220 may be configured to update the game history information of the blockchain network based on the first game result information.

According to an embodiment, the processor 220 may be configured to update a match table of league games by using the game history information of the blockchain network.

According to an embodiment, the processor 220 may be configured to assign a plurality of registered users in a plurality of league games based on information about a plurality of users registered in the blockchain network before the performing of the game.

According to an embodiment, the processor 220 may be configured to pay a cryptocurrency corresponding to a victory point (VP) acquired in the game to the first user based on at least one of the first game result information and the game history information.

According to an embodiment, the processor 220 may be configured to request a first node on the network of the blockchain to record the first game result information in a block constituting the blockchain in order to receive a verification of the first game result information and update the game history information based on the first game result information by receiving a message indicating that the first game result information has been verified from the network of the blockchain.

According to an embodiment, the processor 220 may encrypt the first game result information and transmit the encrypted first game result information to the first node.

According to an embodiment, the processor 220 may generate a first hash value corresponding to first transaction information by applying the first game result information to a hash function for generating unique data for the first game result information. Also, the processor 220 may be configured to generate a first cryptogram indicating a digital signature of the first game result information by encrypting the first hash value with a private key of the first user and transmit the first cryptogram together with the first game result information to the first node.

According to an embodiment, the processor 220 may transmit the first game result information to a plurality of nodes in the blockchain.

According to an embodiment, the processor 220 may be configured to receive a confirmation of the first user and a confirmation of the second user with respect to the first game result information in the obtaining of the first game result information that is the game result between the first user and the second user.

The first game result information may include at least one of address information of a first account that is an account of the first user, address information of a second account that is an account of the second user, a victory point acquired by the first user in the game, a victory point acquired by the second user in the game, game play time information, and information proving whether the result of the game is confirmed.

According to an embodiment, the processor 220 may be configured to display at least one of the first game result information and the game history information updated based on the first game result information, in response to an input for requesting the game result.

According to an embodiment, the processor 220 may be configured to update the first account that is the first user's account and the second account that is the second user's account, based on the first game result information and game history information accumulated based on the first game result information.

The communicator 230 may transmit/receive data or signals to/from the user device 300 (see FIG. 1) and the database through the network under the control of the processor 220.

The communicator 230 may communicate with the user device 300 by using at least one of wireless communication and wired communication. According to an embodiment, the communicator 230 may communicate with the user device 300 to provide the content determined during the game play to the user under the control of the processor 220. Also, the communicator 230 may receive user information of the user playing the game from a database (not illustrated), under the control of the processor 220. The communicator 230 may receive user information of the user playing the game from the user device 300, under the control of the processor 220.

For example, under the control of the processor 220, the communicator 230 may transmit various information about game play situations, game results, or the like to the user device 300 playing the game. Also, the communicator 230 may transmit the first game result information that is the game result between the first user and the second user, to the blockchain network 100 under the control of the processor 220.

The communicator 230 may be a hardware module such as a network interface card, a network interface chip, and a network interface port or may be a software module such as a network device driver or a networking program.

The game service providing apparatus 200 may include more components than those illustrated in FIG. 2.

Figure 3:
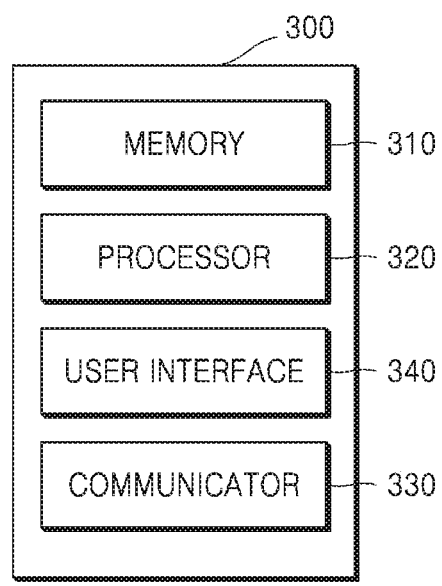
FIG. 3 is a diagram for describing a detailed configuration of a user device according to an embodiment.

FIG. 3 is a diagram for describing a detailed configuration of a user device 300 according to an embodiment.

Also, the user device 300 may be a device for a user to play a game under the control of a game service provider server.

The user device 300 may include a memory 310, a processor 320, a user interface 340, and a communicator 330.

According to an embodiment, the user device 300 may include a user's PC. Also, the user device 300 is not limited to the user's PC and may include a PC in another place (e.g., a PC room), a user's mobile device (e.g., a smart phone, a tablet, or a wearable device), or the like.

The memory 310 may be a computer-readable recording medium and may include a permanent mass storage device such as a random-access memory (RAM), a read-only memory (ROM), and a disk drive. Also, an operating system and at least one program code (e.g., a code for driving a game program driven by the user device) may be stored in the memory 310. Such software components may be loaded from a computer-readable recording medium separate from the memory 310 by using a drive mechanism. Such a separate computer-readable recording medium may include a computer-readable recording medium such as a DVD/CD-ROM drive or a memory card. In another embodiment, software components may be loaded into the memory 310 through the communicator 330 instead of a computer-readable recording medium. For example, at least one program may be loaded into the memory 310 based on a program installed by files provided by developers or the game service provider server (see 200 in FIG. 1) that distributes game installation files or patch files.

According to an embodiment, the processor 320 may execute one or more programs stored in the memory 310 or instructions provided through the communicator 330. The processor 320 may include a single core, a dual core, a triple core, a quad core, or any multiple core thereof. Also, the processor 320 may include a plurality of processors.

According to an embodiment, the user interface 340 may receive a user input. For example, the user interface 340 may receive a user input for requesting security release.

The user interface 340 may include, but is not limited to, a key pad, a dome switch, a touch pad (e.g., a capacitive overlay type, a resistive overlay type, an infrared beam type, a surface acoustic wave type, an integral strain gauge type, or a piezoelectric type), a jog wheel, or a jog switch.

The communicator 330 may provide a function for the user device 300 and the game service provider server (see 200 in FIG. 1) to communicate with each other through the network. For example, the request generated by the processor 320 of the user device 300 according to the program code stored in the recording device such as the memory 310 may be transmitted to the game service providing apparatus 200 under the control of the communicator 330. Also, the control signals, commands, contents, files, or the like provided by the game service providing apparatus 200 may be received by the user device 300 through the communicator 330 of the user device 300. For example, the control signals, commands, or the like of the game service providing apparatus 200 may be transmitted to the processor 320 or the memory 310 through the communicator 330, and contents, files, or the like may be loaded into a separate computer-readable recording medium of the user device 300.

The user device 300 may include more components than those illustrated in FIG. 3. For example, the user device 300 may further include a display (not illustrated). The display may include at least one of a liquid crystal display (LCD), a thin film transistor-liquid crystal display (TFT-LCD), an organic light-emitting diode (OLED) display, a flexible display, a three-dimensional (3D) display, and an electrophoretic display. When a display and a touch pad are configured as a touch screen by forming a layer structure, the display may be used as an input device in addition to an output device.

FIG. 4 is a flowchart of a method of recording a game result according to an embodiment.

The method of recording a game result of FIG. 4 may be a method of recording a game result by playing a game between a plurality of users. Also, the method illustrated in FIG. 4 may be performed in the game service providing apparatus 200 of FIG. 2.

In operation S410, the game service providing apparatus 200 may be configured to register a plurality of users including a first user and a second user in a blockchain network. Operation S410 may be performed by the user device 300 alone instead of under the control of the game service providing apparatus 200.

Registering the users in the blockchain network may mean registering the user accounts on the blockchain network. Also, it may include registering at least some of the users' account information about the first game application to the blockchain network.

In operation S420, the game service providing apparatus 200 may control the first user and the second user to perform the game according to the execution of the first game application.

Here, the first user and the second user may be one user or may be a plurality of user groups in which a plurality of users form one team.

For example, the game service providing apparatus 200 may assign a plurality of registered users in a league game based on information about a plurality of users registered in the blockchain network before playing the game.

For example, the game service providing apparatus 200 may assign a predetermined number of users among a plurality of users in the first league in descending order of user level based on information of the plurality of users. Also, based on the information of the plurality of users, among the other users other than the users assigned in the first league among the plurality of users, the game service providing apparatus 200 may assign a predetermined number of users in the second league in descending order of user level. The game service providing apparatus 200 may assign some of the plurality of users registered in the blockchain network in the league and may not assign some other users in the league.

The game service providing apparatus 200 may generate a match table about a plurality of users registered in the blockchain network, thereby allowing a plurality of users to play a match game and store information about the game result in real time.

Also, the game service providing apparatus 200 may be configured to perform a match game between a plurality of users or a match game between a computer (e.g., artificial intelligence) and a user.

In another embodiment, the game service providing apparatus 200 may be configured to perform an individual game instead of a match game between a plurality of users.

In operation S430, the game service providing apparatus 200 may obtain first game result information that is information about the game result between the first user and the second user, from the first game application.

According to an embodiment, the first game result information may include at least one of address information of a first account that is an account of the first user, address information of a second account that is an account of the second user, a victory point acquired by the first user in the game, a victory point acquired by the second user in the game, game play time information of the first user and the second user, and information proving whether the result of the game is confirmed.

In operation S440, the game service providing apparatus 200 may update game history information of the blockchain network based on the first game result information.

The game history information may include a list of a plurality of users registered in the blockchain, a victory point acquired by each of a plurality of users in the game, the game history and game time of a plurality of users, and the name of a league in which a plurality of users are assigned. The game history information may include a league game match table indicating the game situation of the current league game.

Also, the game service providing apparatus 200 may update the league game match table based on the first game result information. The league game match table may be assigned such that multiple users are matched to their respective levels, and may be updated in real time to reflect the current win/loss of multiple users.

Figure 5A:
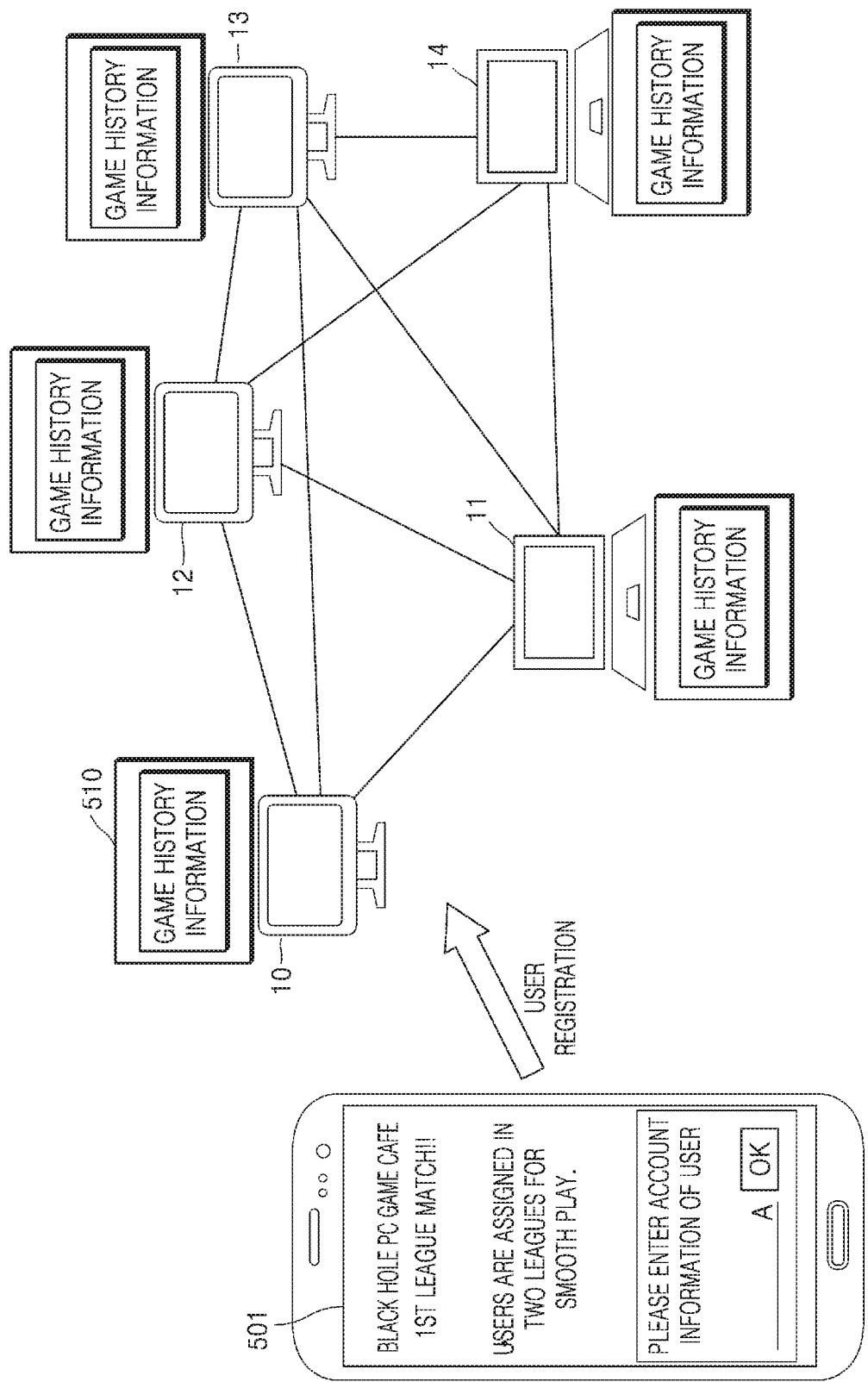
FIG. 5A is a diagram for describing that a game service providing apparatus registers a plurality of users in a blockchain network according to an embodiment.

FIG. 5A is a diagram for describing that a game service providing apparatus 200 registers a plurality of users in a blockchain network according to an embodiment.

According to an embodiment, the game service providing apparatus 200 may be configured to register a program or at least one instruction for holding a game league to be performed between a plurality of users in the blockchain network 100.

The game service providing apparatus 200 may include a personal computer, a cloud server, or the like and may correspond to one component in the blockchain network 100.

Moreover, registering a plurality of users in the blockchain network may be performed based on an input of the user device 300 instead of under the control of the game service providing apparatus 200.

According to an embodiment, the game service providing apparatus 200 may generate a code corresponding to a program for holding a game league by using a predetermined language and upload the same into the blockchain network 100.

The game service providing apparatus 200 may receive information of users from the user device 300 in order to store information about a plurality of users in the blockchain network 100. The game service providing apparatus 200 may receive information of users from an external database in order to store information about a plurality of users in the blockchain network 100.

When the game service providing apparatus 200 stores information about a plurality of users on the blockchain network 100, the game service providing apparatus 200 may use Proof of Work (PoW) algorithm to check whether information about a plurality of users is not forged data.

The game service providing apparatus 200 may store information about a plurality of users in game history information 510 on the blockchain network 100.

The game service providing apparatus 200 may receive user information through a user input by providing a user interface 501 for receiving user information to the user device 300.

Figure 5B:
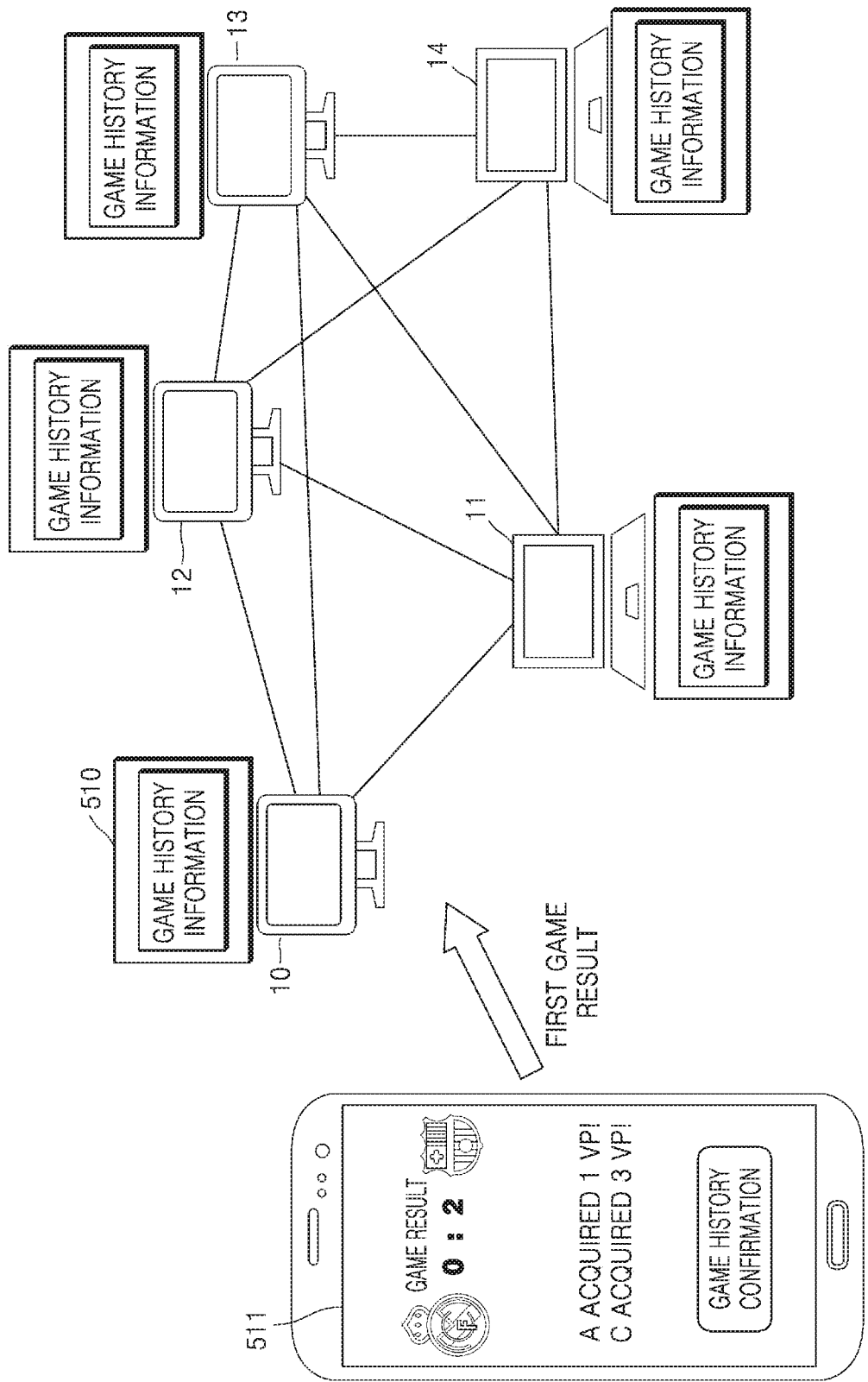
FIG. 5B is a diagram for describing that a game service providing apparatus obtains first game result information according to an embodiment.

FIG. 5B is a diagram for describing that a game service providing apparatus 200 obtains first game result information according to an embodiment.

According to an embodiment, the game service providing apparatus 200 may obtain the first game result information from the first game application after a plurality of users perform the game according to the execution of the first game application.

FIG. 5B illustrates a user interface 511 in which a plurality of users perform the game according to the execution of the first game application and represent the result thereof.

The game service providing apparatus 200 may control the first user and the second user to perform the game according to the execution of the first game application, based on a predetermined league game match table. The game service providing apparatus 200 may obtain the first game result information that is information about the game result between the first user and the second user, from the first game application. The game service providing apparatus 200 may store the first game result information after receiving a game history confirmation from the first user and the second user.

Herein, what is described as being performed by the game service providing apparatus 200 may be performed by the user device 300. Also, when the game service providing apparatus 200 is included in the blockchain network 100, what is described as being performed by the game service providing apparatus 200 may be performed in the blockchain network 100.

Figure 6:
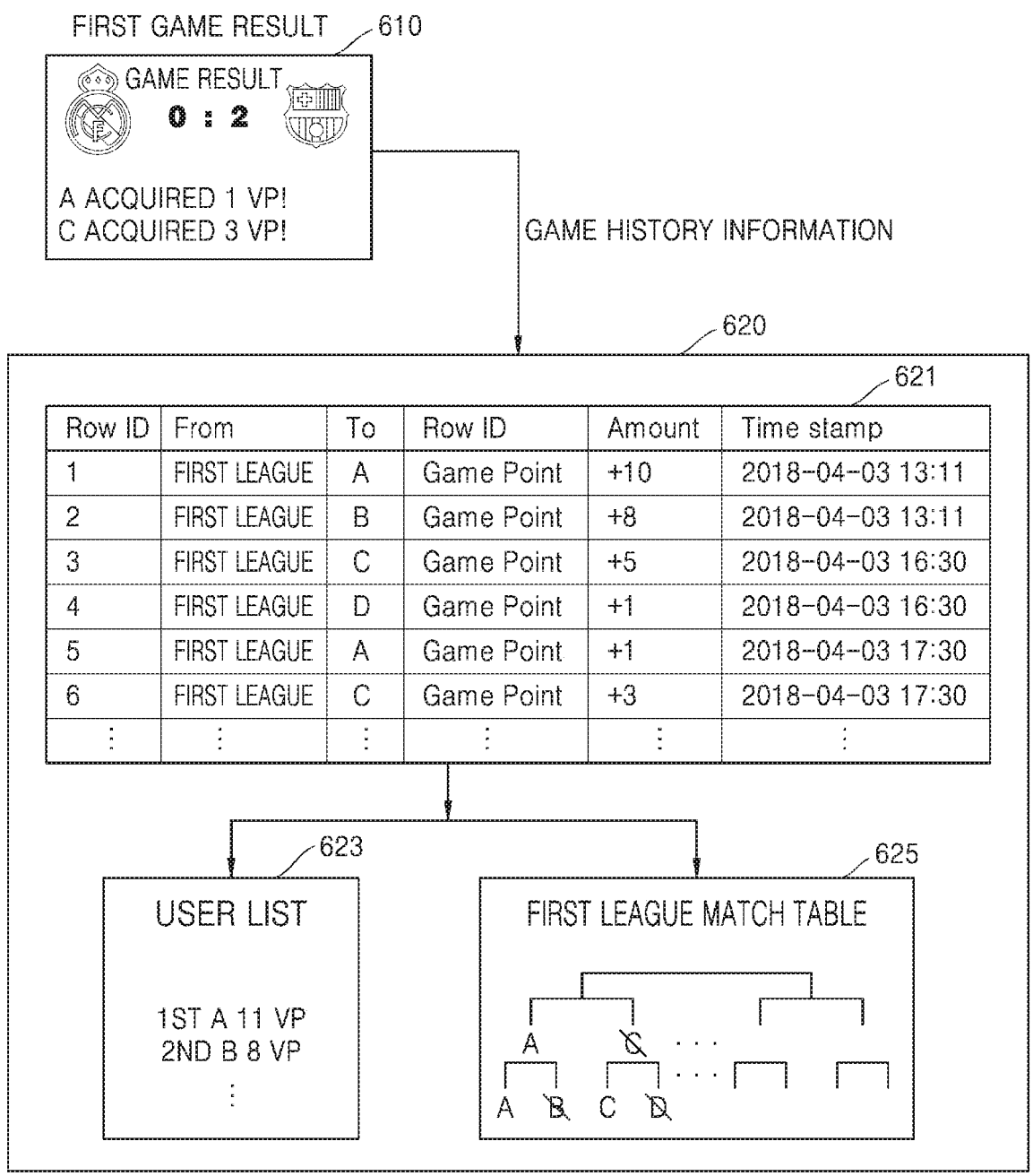
FIG. 6 is a diagram for describing that a game service providing apparatus updates game history information of a blockchain network based on first game result information according to an embodiment.

FIG. 6 is a diagram for describing that a game service providing apparatus 200 updates game history information of a blockchain network based on first game result information according to an embodiment.

Game history information 620 may include entire game history information 621 and a list 623 of a plurality of users registered in the blockchain. Also, the game history information 620 may include a league game match table 625 indicating the game situation of the current league game.

After the entire game history information 621 is registered in the blockchain network 100 of a plurality of users, a plurality of accumulated users may store the first game result information. For example, the first game result information may be information generated when each game ends and may include the name of an assigned league (From), the names of multiple users (To), the transaction type (Txn Type), and the victory point (Amount)), the timestamp, or the like. The entire game history information 621 may accumulate and store the first game result information.

The list 623 of the plurality of users may include the victory point acquired in the game by each of the plurality of users and the ranking of the plurality of users.

The league game match table 625 may be assigned such that multiple users are matched to their respective levels, and may be updated in real time to reflect the current win/loss of multiple users. Although FIG. 6 illustrates that the league game match table 625 includes a first league match table, it may include a match table about a plurality of leagues.

Based on the obtained first game result information, the game service providing apparatus 200 may update the entire game history information 621, the list 623 of the plurality of users registered in the blockchain, and the league game match table 625 in real time.

Figure 7:
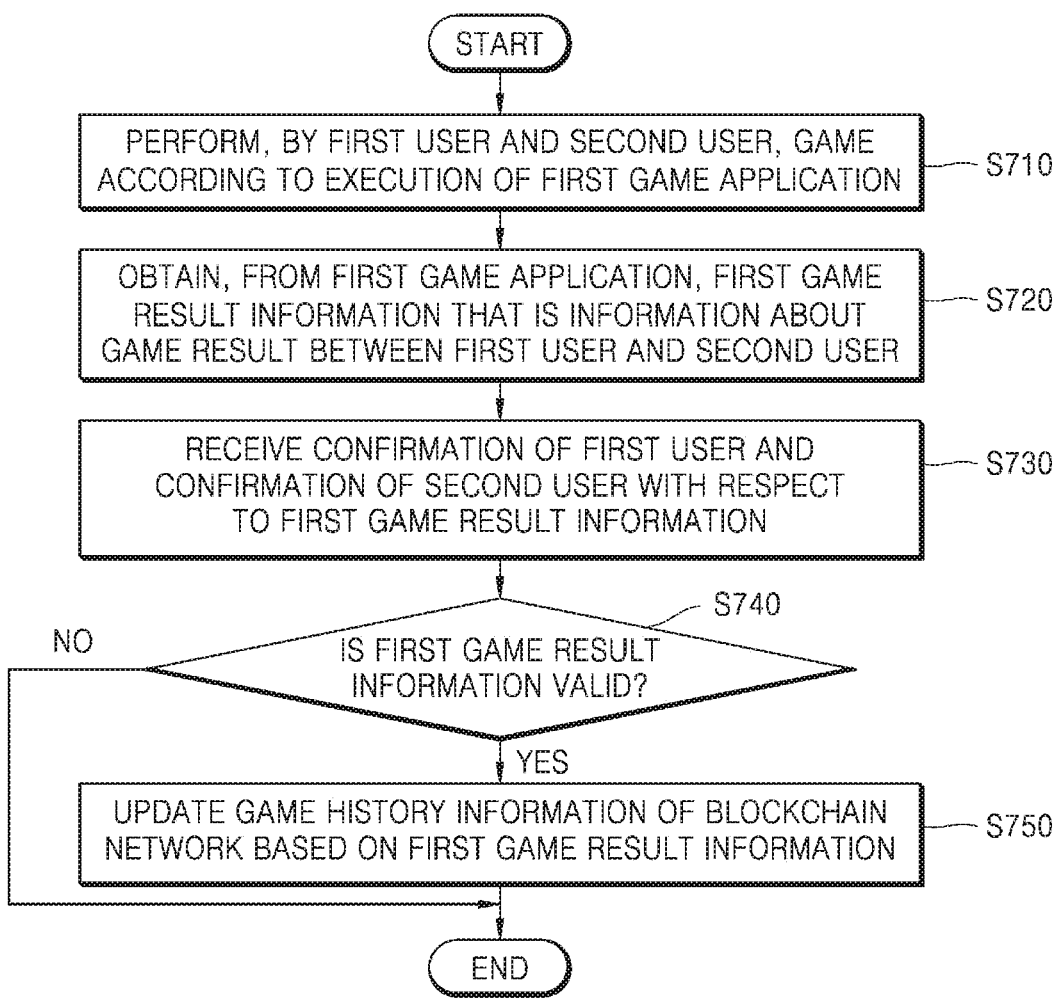
FIG. 7 is a flowchart of a method of recording a game result according to an embodiment.

FIG. 7 is a flowchart of a method of recording a game result according to an embodiment.

The method of recording a game result of FIG. 7 may be a method of recording a game result by playing a game between a plurality of users. Also, the method illustrated in FIG. 7 may be performed in the game service providing apparatus 200 of FIG. 2.

In operation S710, the game service providing apparatus 200 may control the first user and the second user to perform the game according to the execution of the first game application.

In operation S720, the game service providing apparatus 200 may obtain first game result information that is information about the game result between the first user and the second user, from the first game application.

In operation S730, the game service providing apparatus 200 may receive a confirmation of the first user and a confirmation of the second user with respect to the first game result information.

Receiving the confirmation with respect to the first game result information may be a process of primarily verifying the validity of the first game result information by the user's confirmation.

In operation S740, the game service providing apparatus 200 may determine whether the first game result information is valid. The nodes of the blockchain network 100 may determine whether the first game result information is valid, and may allow a valid block including only data of the valid first game result information and a block header to be connected to the blockchain. For example, the nodes of the blockchain network 100 may generate a valid block by performing PoW for the block.

In operation S750, when the validity of the first game result information is verified in operation S740, the game service providing apparatus 200 may update the game history information of the blockchain network based on the first game result information.

The game service providing apparatus 200 may return to operation S710 to control other users to perform the game according to the execution of the first game application.

Figure 8:
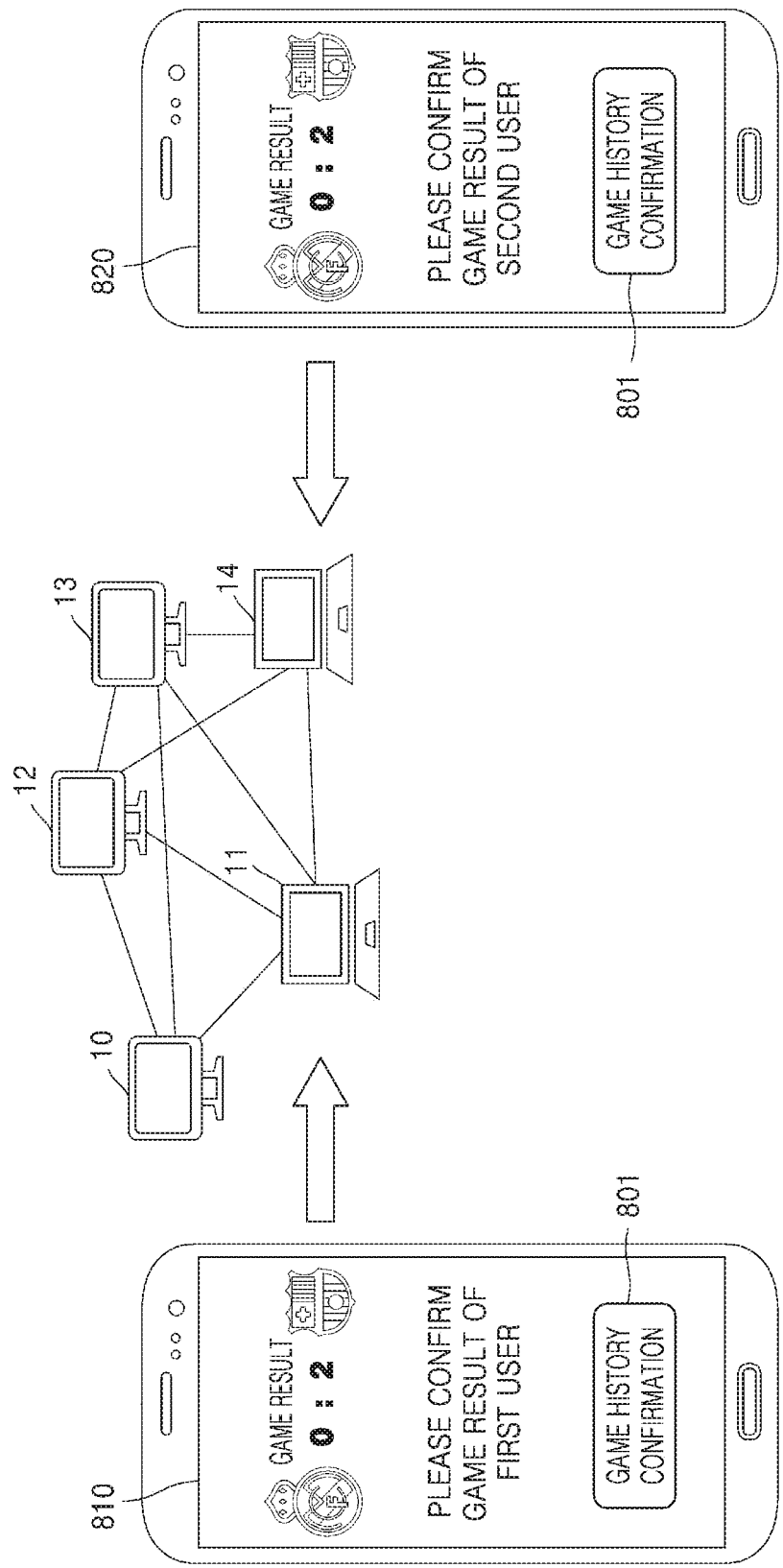
FIG. 8 is a diagram for describing that a game service providing apparatus receives a first user's confirmation and a second user's confirmation of first game result information.

FIG. 8 is a diagram for describing that a game service providing apparatus receives a first users confirmation and a second user's confirmation of first game result information.

When the game between the first user and the second user is ended, the game service providing apparatus 200 may display a user interface 810 for displaying the game history to the first user and a user interface 820 for displaying the game history to the second user.

The game service providing apparatus 200 may receive an input of a game history confirmation 801 from each of the first user and the second user. The game service providing apparatus 200 may upload the first game result information into the blockchain network 100 after receiving the confirmation of the game history from the first user and the second user.

Figure 9:
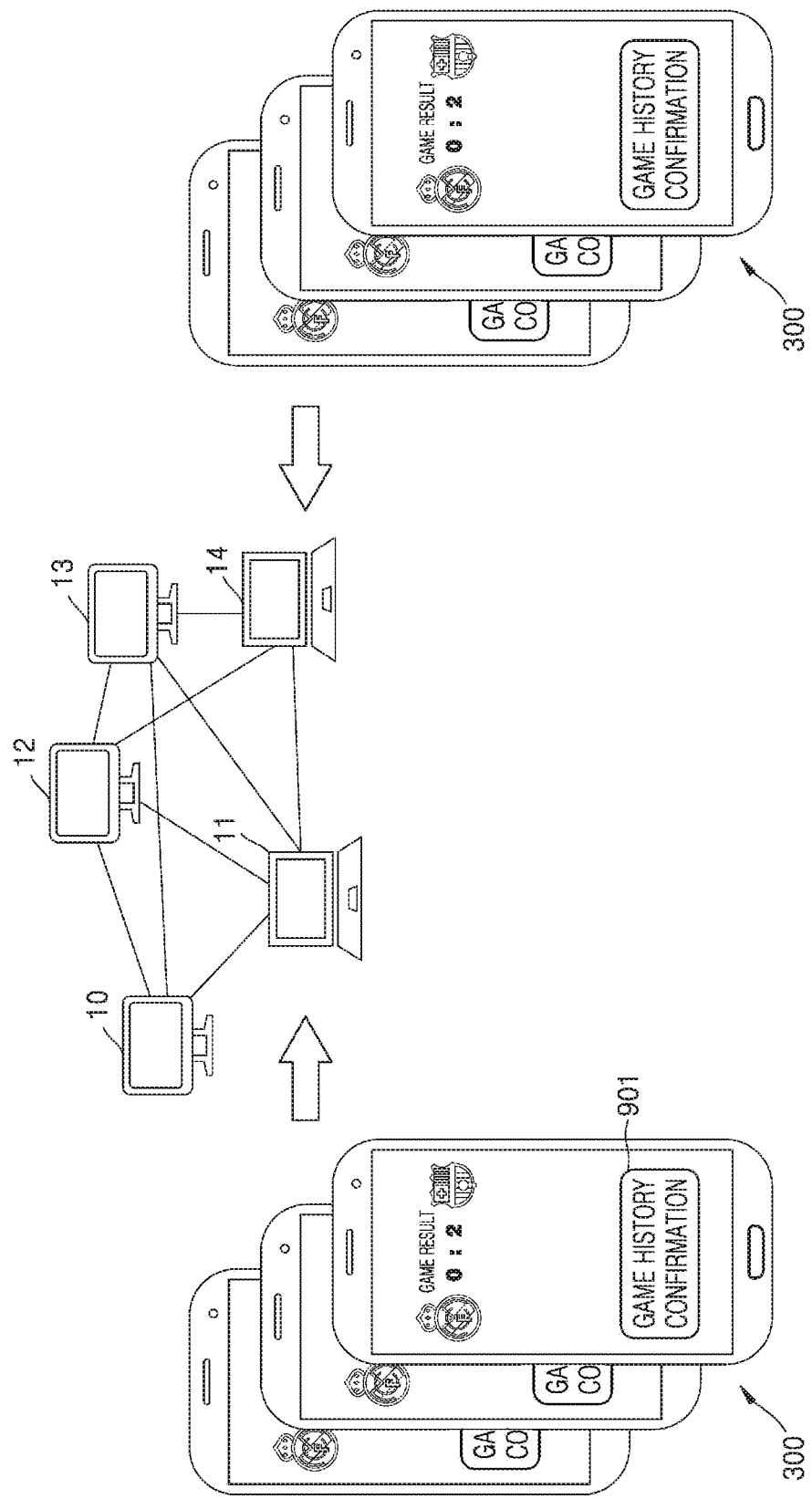
FIG. 9 is a diagram for describing that a game service providing apparatus receives a first user's confirmation and a second user's confirmation of first game result information.

FIG. 9 is a diagram for describing that a game service providing apparatus receives a first users confirmation and a second user's confirmation of first game result information.

Referring to FIG. 9, the game service providing apparatus 200 may be configured to perform a game played between a first user group and a second user group including a plurality of users according to the execution of the first game application. The game service providing apparatus 200 may receive an input of a game history confirmation 901 from a predetermined number of users included in the first user group and the second user group. For example, when an input of an 80% or more game history confirmation 901 included in the first user group and an input of an 80% or more game history confirmation 901 included in the second user group are received, the first game result information may be uploaded into the blockchain network 100.

The user device 300 illustrated in FIG. 9 may include various wearable devices having a communication function and a data processing function, as well as a user's smart phone, tablet PC, or watch capable of being authenticated with a device possessed by the user.

Figure 10:
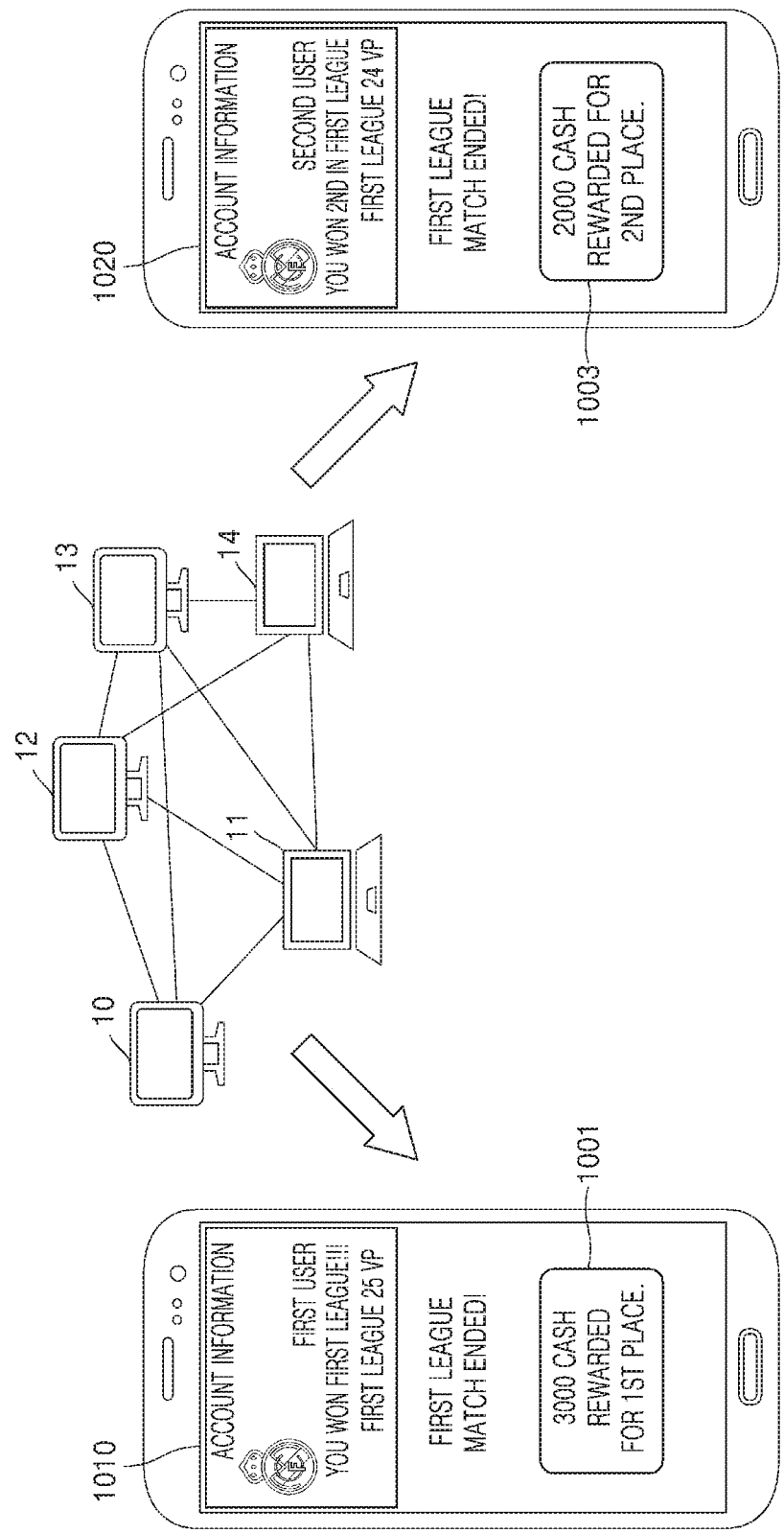
FIG. 10 is a diagram for describing that a cryptocurrency corresponding to a victory point (VP) acquired in the game is paid to a user.

FIG. 10 is a diagram for describing that a cryptocurrency corresponding to a victory point acquired in the game is paid to a user.

The blockchain network 100 may store a program code of a smart contract for paying a certain price to a winner in the league. Also, the blockchain network 100 may store a program code of a smart contract for paying users the cryptocurrency corresponding to the victory point acquired in the game based on at least one of the first game result information and the game history information.

For example, the game service providing apparatus 200 may respectively provide 100, 50, and 30 caches from the game organizer in descending order of user's victory point at the end of the game. The game organizer may be one of a plurality of users or may be a subject that progresses the game by generating a game league by using the game service providing apparatus 200.

Also, the game service providing apparatus 200 may be configured to pay the user a reward corresponding to the victory point based on the first game result information.

Also, the game service providing apparatus 200 may provide 3000 caches to the first user that is the final first place, based on the game history information of a plurality of users including the first user and the second user (1001). Also, the game service providing apparatus 200 may provide 2000 caches to the second user that is the final second place, based on the game history information of a plurality of users including the first user and the second user (1003).

The game service providing apparatus 200 may provide the user with the cryptocurrency commonly used on the blockchain network 100 performing a method of recording the game result, as a reward, and may provide the reward in the form of the game money that is the currency in the game, or in the form of various currencies corresponding thereto.

The game service providing apparatus 200 may be configured to update the first account that is the first user's account and the second account that is the second user's account, based on the first game result information and the game history information accumulated based on the first game result information.

The game service providing apparatus 200 may display a content 1010 of the first account updated based on the game history, on the screen of the first user's device. Also, the game service providing apparatus 200 may display a content 1020 of the second account updated based on the game history, on the screen of the second user's device.

Figure 11:
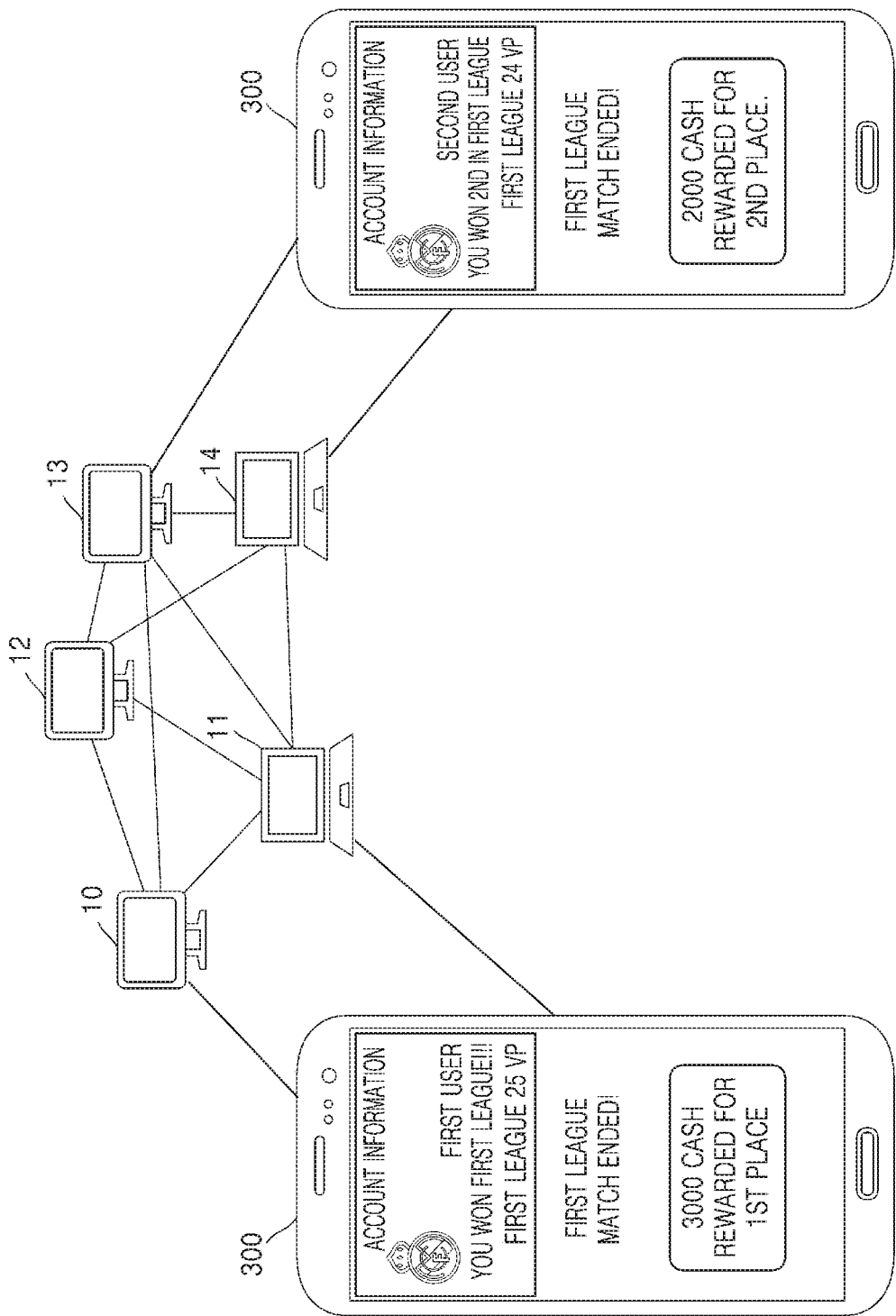
FIG. 11 is a diagram for describing a case where a user device is a node on a network of a blockchain, according to an embodiment.

FIG. 11 is a diagram for describing a case where a user device is a node on a blockchain network, according to an embodiment.

According to an embodiment, the user device 300 may be a node included in the blockchain network 100. The user device 300 may store a block of the blockchain network 100, and may store the first game result information in the block when the game of a plurality of users ends.

Figure 12:
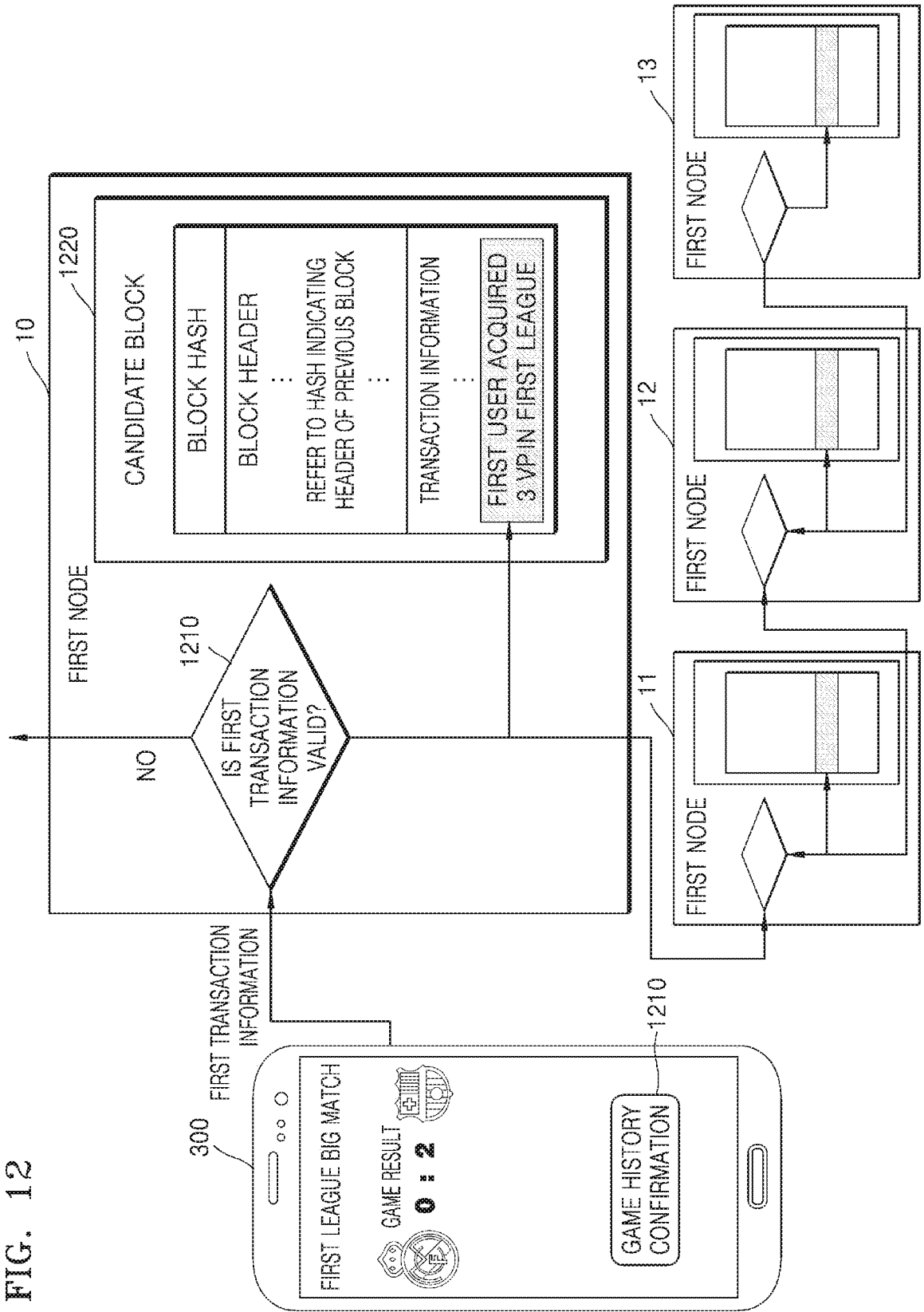
FIG. 12 is a diagram for describing a process of propagating a valid transaction on a network of a blockchain to nodes on the network of the blockchain and recording the same in the blockchain, according to an embodiment.

FIG. 12 is a diagram for describing a process of propagating a valid transaction on a network of a blockchain to nodes on the network of the blockchain and recording the same in the blockchain, according to an embodiment.

According to an embodiment, the transaction may represent information generated according to the game result between users, and transaction information may correspond to game result information.

Referring to FIG. 12, after performing the game between the first user and the second user, the game service providing apparatus 200 may allow the user device 300 to transmit the game history in order to transmit the first game result information to the blockchain network 100 (1201).

The game service providing apparatus 200 may update "the first user acquired 3 victory points in the first league", based on the first game result information corresponding to first transaction information. The game service providing apparatus 200 may encrypt a first transaction and transmit the encrypted first transaction to the first node 10 on the network of the blockchain. An operation of the game service providing apparatus 200 encrypting the first transaction and transmitting the result thereof to the first node 10 will described below in detail with reference to FIG. 13.

The first node 10 may decrypt the encrypted first transaction and verify whether the first transaction is valid, based on the decrypted result (1210). An operation of the first node 10 verifying the validity of the first transaction will be described below in detail with reference to FIG. 14.

As a result of verifying the validity of the first transaction, when the first transaction is not valid, the first node 10 may discard the first transaction.

As a result of verifying the validity of the first transaction, when the first transaction is valid, the first node 10 may transmit the first transaction to the second node 11 on the network of the blockchain. Also, the first node 10 may record a first transaction 1221 indicating that "the first user acquired 3 points in the first league" in a candidate block 1220. When certain transactions are recorded in the candidate block 1220, the first node 10 may generate a valid block by performing PoW for the candidate block 1220. Also, when the validity of the first transaction is also verified in the second node 11, the second node 11 may add the first transaction to the candidate block 1220 and generate a valid block by performing PoW for the candidate block 1220. The third node 12 and the fourth node 13 may operate similarly to the second node 11.

In the process of generating a valid block in the first node 10 and adding the same to the blockchain, the first node 10 may calculate the root of a Merkle tree about certain transactions. The first node 10 may generate a hash reference indicating a previous block header from the viewpoint of a block to be added to the blockchain. The first node 10 may obtain a difficulty level required for PoW or constraint for the block to be added to the blockchain. The first node 10 may determine whether the value of a block hash, which is generated by applying a hash function to the root of the Merkle tree, the hash reference indicating the previous block header, the difficulty level, the data of the timestamp, and the nonce, satisfies the constraint. The first node 10 may increase the nonce from 0 to 1, obtain the value of the nonce satisfying the constraint, and perform POW for the candidate block 1220. The first node 10 may add the candidate block 1220 as a valid block to the blockchain. Also, the first node 10 may transmit the valid block to other nodes 11, 12, and 13 on the network of the blockchain.

The other nodes 11, 12, and 13 on the network of the blockchain may perform verification on the valid block received from the first node 10, and add the valid block to the blockchain possessed by the respective nodes 11, 12, and 13.

Figure 13:
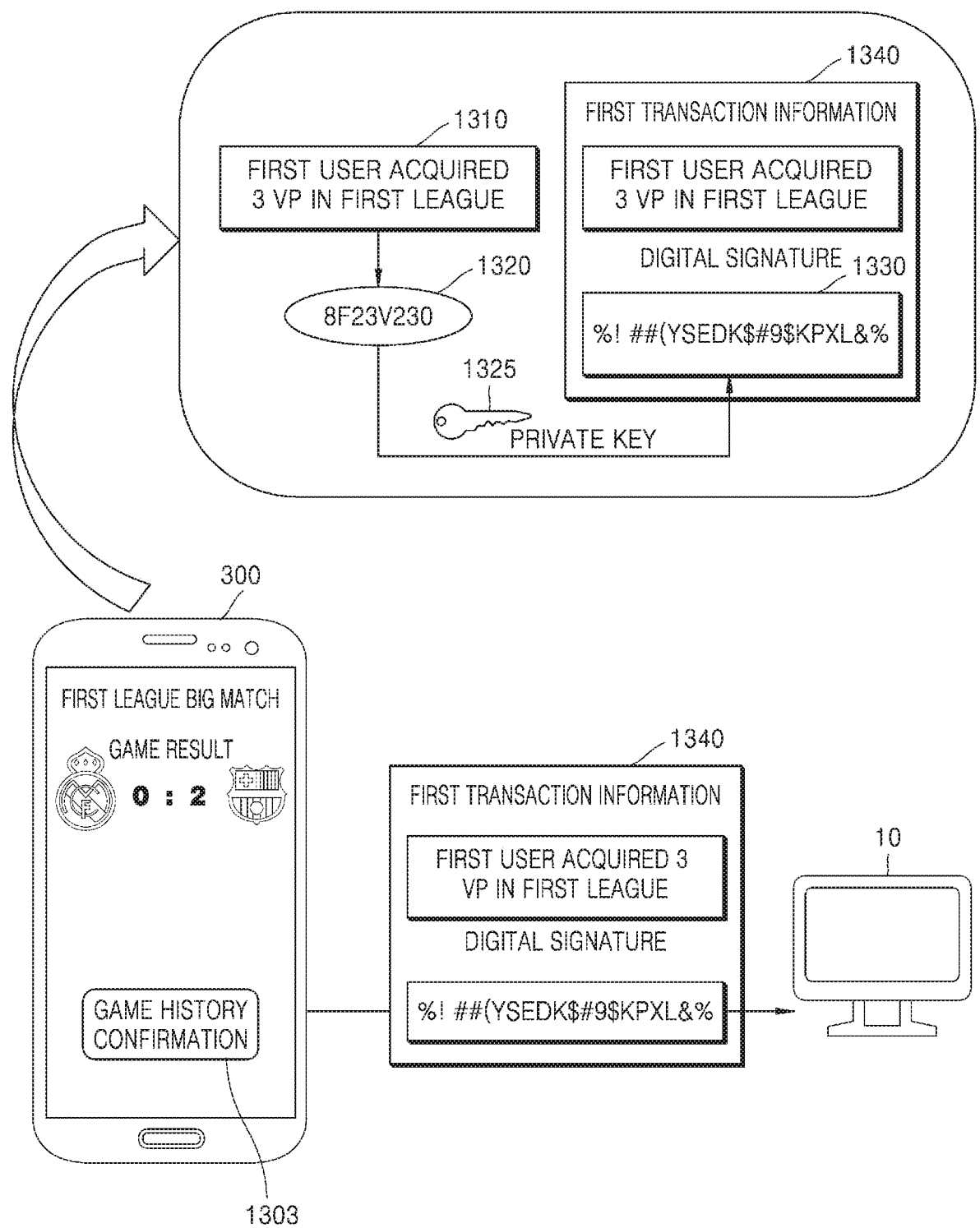
FIG. 13 is a diagram for describing a process of transmitting a digitally-signed transaction from an electronic apparatus to a node on a network of a blockchain, according to an embodiment.

FIG. 13 is a diagram for describing a process of transmitting a digitally-signed transaction from an electronic apparatus to a node on a network of a blockchain, according to an embodiment.

The game service providing apparatus 200 may encrypt a transaction 1310 corresponding to "the first user acquired 3 points in the first league", and may transmit an encrypted transaction 1340 to the first node 10 on the network of the blockchain.

Particularly, in response to the user device 300 transmitting the game history 1303, the game service providing apparatus 200 may generate a hash value "8F23V230" 1320 corresponding to the transaction 1310 by applying the transaction 1310 corresponding to "the first user acquired 3 points in the first league" to a hash function for generating unique data about the transaction.

The game service providing apparatus 200 may generate a first cryptogram "%! ##(YSEDK$# 9$KPXL&%" 1330 representing a digital signature of the transaction 1310 by encrypting the hash value "8F23V230" 1320 with a private key 1325 of the first user. The user device 300 may transmit transaction 1340 obtained by combining the first cryptogram "%!##(YSEDK$#9$KPXL&%" 1330 with the transaction 1310, to the first node 10.

Figure 14:
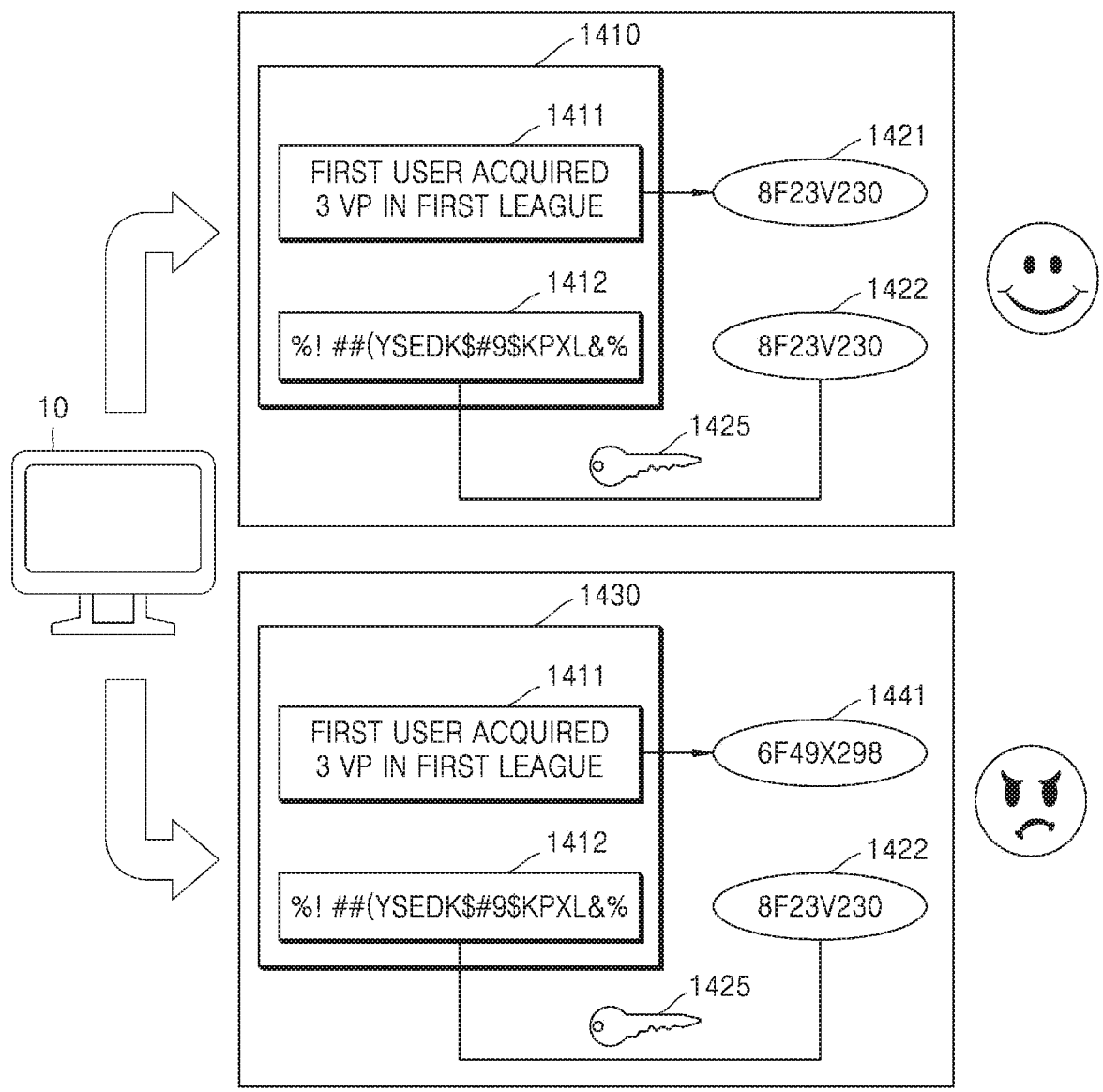
FIG. 14 is a diagram for describing a process of verifying the validity of a transaction in a node on a network of a blockchain, according to an embodiment.

FIG. 14 is a diagram for describing a process of verifying the validity of a transaction in a node on a network of a blockchain, according to an embodiment.

For example, the first node 10 may receive a transaction 1410 from the user device 300 of the first user. The transaction 1410 may include transaction information 1411 "the first user acquired 3 points in the first league" and a first cryptogram "%!##(YSEDK$#9$KPXL&%" 1412. The first node 10 may generate a hash value "8F23V230" 1421 corresponding to the transaction information 1411 by applying a hash function to the transaction information 1411. The first node 10 may generate a hash value "8F23V230" 1422 by decrypting the first cryptogram "%!## (YSEDK$#9$KPXL&%" 1412 by using a public key 1425 of the first user. Because the hash value "8F23V230" 1421 and the hash value "8F23V230" 1422 are equal to each other, the first node 10 may determine that the transaction 1410 received from the user device 300 of the first user is valid.

As another example, the first node 10 may receive a transaction 1430 from the user device 300 of the first user. The transaction 1430 may include transaction information 1411 "the first user acquired 13 points in the first league" and a first cryptogram "%!##(YSEDK$#9$KPXL&%" 1412. The first node 10 may generate a hash value "6F49X298" 1441 corresponding to the transaction information 1411 by applying a hash function to the transaction information 1411. The first node 10 may generate a hash value "8F23V230" 1422 by decrypting the first cryptogram "%!## (YSEDK$#9$KPXL&%" 1412 by using a public key 1425 of the first user. Because the hash value "6F49X298" 1441 and the hash value "8F23V230" 1422 are not equal to each other, the first node 10 may determine that the transaction 1430 received from the user device 300 of the first user is not valid.

Figure 15:
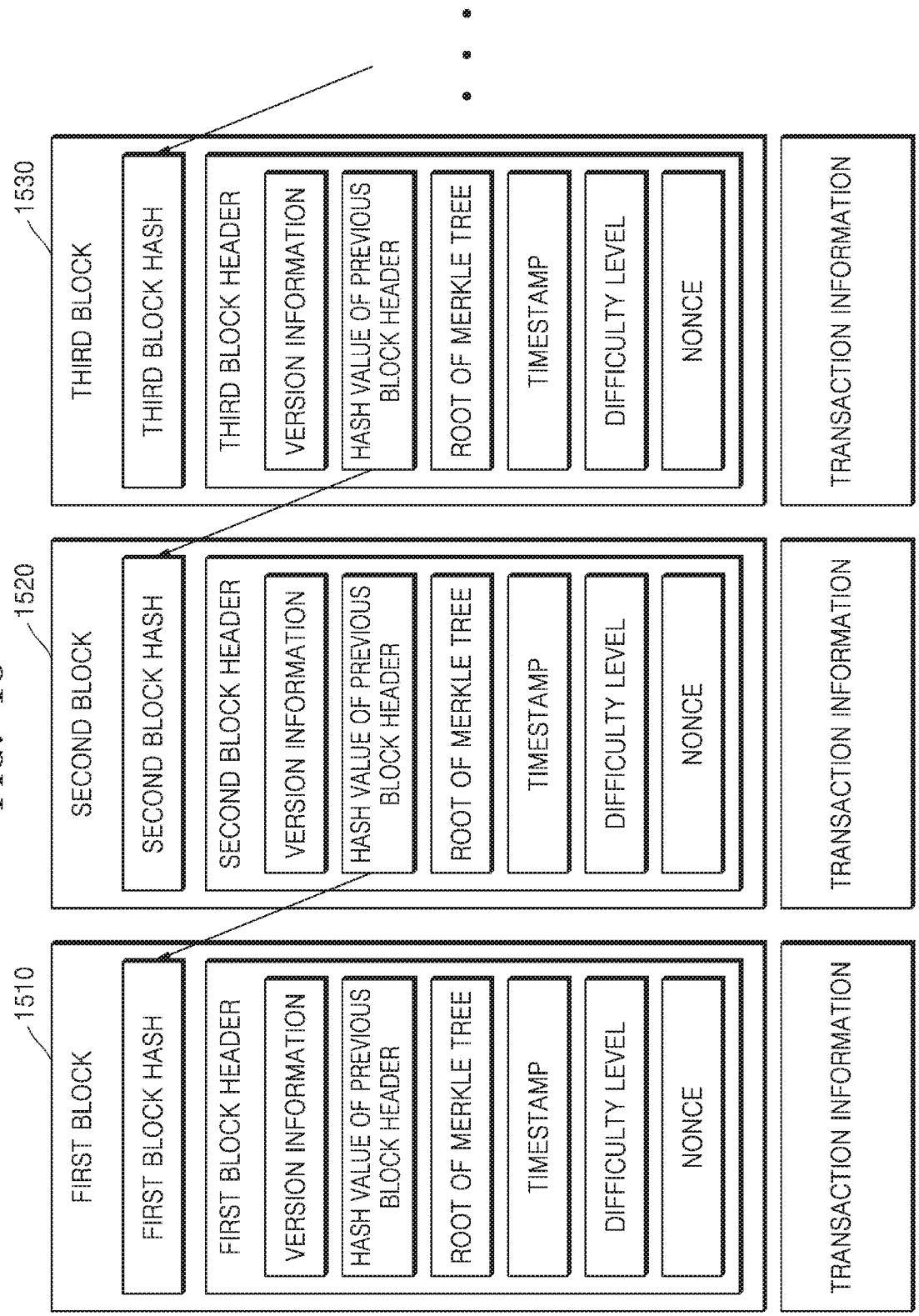
FIG. 15 is a block diagram for describing the structure of a block and a blockchain, according to an embodiment.

FIG. 15 is a block diagram for describing the structure of a block and a blockchain, according to an embodiment.

As illustrated in FIG. 15, a blockchain may be constructed by connecting blocks recording valid transactions. That is, the data structure of the blockchain may be a certain data structure including units in which blocks recording the transaction are arranged in order. Also, the data structure of the blockchain may include a data structure in which each block header is connected in a chain form with reference to the previous block header, a hash reference indicating data of the transaction, and a data structure of a Merkle tree in which data of the transaction is connected in a tree form.

The block may include a block hash, a block header, a transaction, or the like. The block header may include a version of the current program, a hash value of the previous block header, a root of the Merkle tree, a timestamp, a difficulty level, and information of the nonce.

The block hash may be a hash value of the hash function applied by using a version of the current program, a hash value of the previous block header, a root of the Merkle tree, a timestamp, a difficulty level, and information of the nonce as input values. That is, the value of the block hash may be a value obtained by hashing the block header, not a value obtained by hashing the entire block.

The hash value of the previous block header may be used to uniquely identify each block header and refer to the previous block header. When each block header refers to the previous block header, the order of individual block headers and blocks may be maintained. Referring to FIG. 15, because a first block 1510 is the first block and thus there is no previous block thereof, there may be no reference indicating the previous block header. Thus, the hash value of the previous block header of the first block 1510 may be 0. Also, because a second block 1520 has the first block 1510 that is the previous block thereof, the second block header may have a hash value indicating the first block header. Likewise, because a third block 1530 has the second block 1520 that is the previous block thereof, the third block header may have a hash value indicating the second block header.

The Merkle tree may mean a structure in which a hash reference and data of the transaction are connected in a tree form. The hash reference may indicate data of the transaction by using the encrypted hash value. Moreover, because the encrypted hash value is a unique value of the data, different pieces of data may not have the same hash value.

Particularly, in the process of generating the Merkle tree, a hash reference (e.g., a first hash reference, a second hash reference, a third hash reference, or a fourth hash reference) indicating each of data of a transaction (e.g., a first transaction, a second transaction, a third transaction, or a fourth transaction) may be generated. When the hash reference is generated, a hash reference indicating a pair of hash references (e.g., a 12th hash reference indicating the first hash reference and the second hash reference, and a 34th hash reference indicating the third hash reference and the fourth hash reference) may be generated. Thereafter, an operation of generating the hash reference indicating a pair of hash references may be repeatedly performed to generate a single hash reference (e.g., a 1234th hash reference indicating the 12th hash reference and the 34th hash reference). That is, the Merkle tree may be a tree-shaped structure starting from the single hash reference and connected to data of each transaction. The root of the Merkle tree may mean a single hash reference that is finally generated.

The timestamp may mean the time when an operation has started for PoW. The difficulty level may mean the constraint in the hash puzzle or PoW. The nonce may mean a value in which a block hash value is adjusted to satisfy the constraint for PoW.

Figure 16:
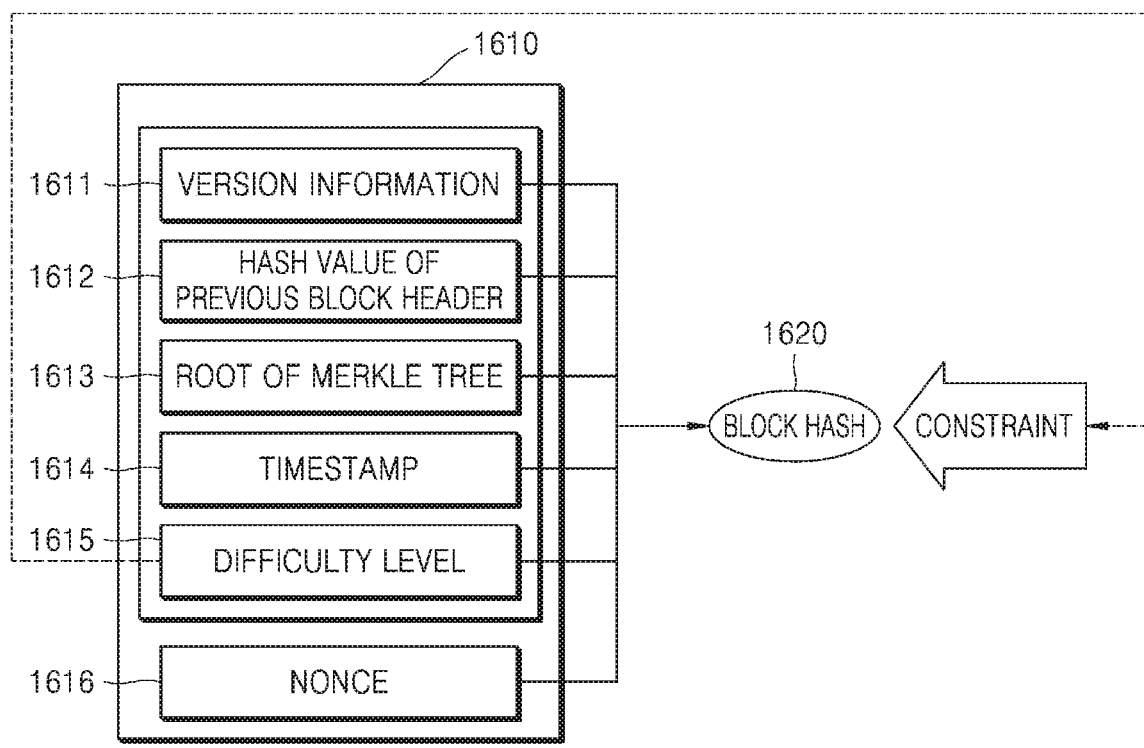
FIG. 16 is a diagram for describing Proof of Work (PoW) and a method of obtaining a nonce and in a node on a network of a blockchain, according to an embodiment.

FIG. 16 is a diagram for describing Proof of Work (PoW) and a method of obtaining a nonce and in a node on a network of a blockchain, according to an embodiment.

The nodes on the network of the blockchain may verify the validity of the transaction and the validity of the block header such that a valid block including only a block header and data of the valid transaction may be connected to the blockchain.

Each of the nodes may generate a valid block by performing PoW for the block. Here, PoW may mean solving a unique hash puzzle of the block.

An element 1610 for PoW may include given data that should not be changed, freely-changeable data, a hash function to be applied, or a constraint given to the hash value. Here, the given data that should not be changed may include version information 1611, a hash value 1612 of the previous block header, a root 1613 of the Merkle tree, a timestamp 1614, and data about a difficulty level 1615. Also, the freely-changeable data may be a nonce 1616. Also, the constraint given to the hash value may be the difficulty level 1615.

As illustrated in FIG. 16, PoW may be performed when the value of a block hash 1620, which is generated by applying a hash function to the version information 1611, the hash value 1612 of the previous block header, the root 1613 of the Merkle tree, the timestamp 1614, the data about the difficulty level 1615, and the nonce 1616, satisfies the constraint.

Particularly, the node may guess the nonce 1616 for PoW for the block and generate a value of the block hash 1620 by combining the guessed nonce 1616 with the version information 1611, the hash value 1612 of the previous block header, and the root 1613 of the Merkle tree, the timestamp 1614, and the data about the difficulty level 1615 and applying a hash function thereto. The node may determine whether the generated value of the block hash 1620 satisfies the constraint. When the value of the block hash 1620 satisfies the constraint, PoW is completed; however, when the value of the block hash 1620 does not satisfy the constraint, the node may repeat the same process after guessing another nonce.

Table 1630 of FIG. 16 illustrates a nonce, data to be hashed, a hash value generated by combining the nonce with the data to be hashed and applying the result to a hash function. For example, the constraint may be a condition in which the first three digits of the hash value are 0. The node may perform a process for PoW while increasing the nonce from 0 to 1. Referring to Table 1630 of FIG. 16, a hash value (000EIXOKXP19) generated by using a nonce 53 satisfies the constraint. The node may complete PoW with 54 trials and errors from the nonce 0 to the nonce 53.

The difficulty level may mean the constraint in the hash puzzle or PoW. The difficulty level may be represented as a natural number, and the number of the difficulty level may mean the number of digits to be filled with zero from the first digit of the hash value. Thus, as the difficulty level increases, the first digit to be filled with zero may increase. As the difficulty level increases, PoW or hash puzzle may be complex and more computational resources and time may be required to find a nonce that satisfies the constraint.

That is, PoW may mean calculating a nonce value, obtaining a block hash value, and generating a valid block having the obtained block hash value as an identifier. Moreover, the node that has generated the valid block may be rewarded. The reward may be determined under the agreement of the nodes on the network of the blockchain.

Figure 17:
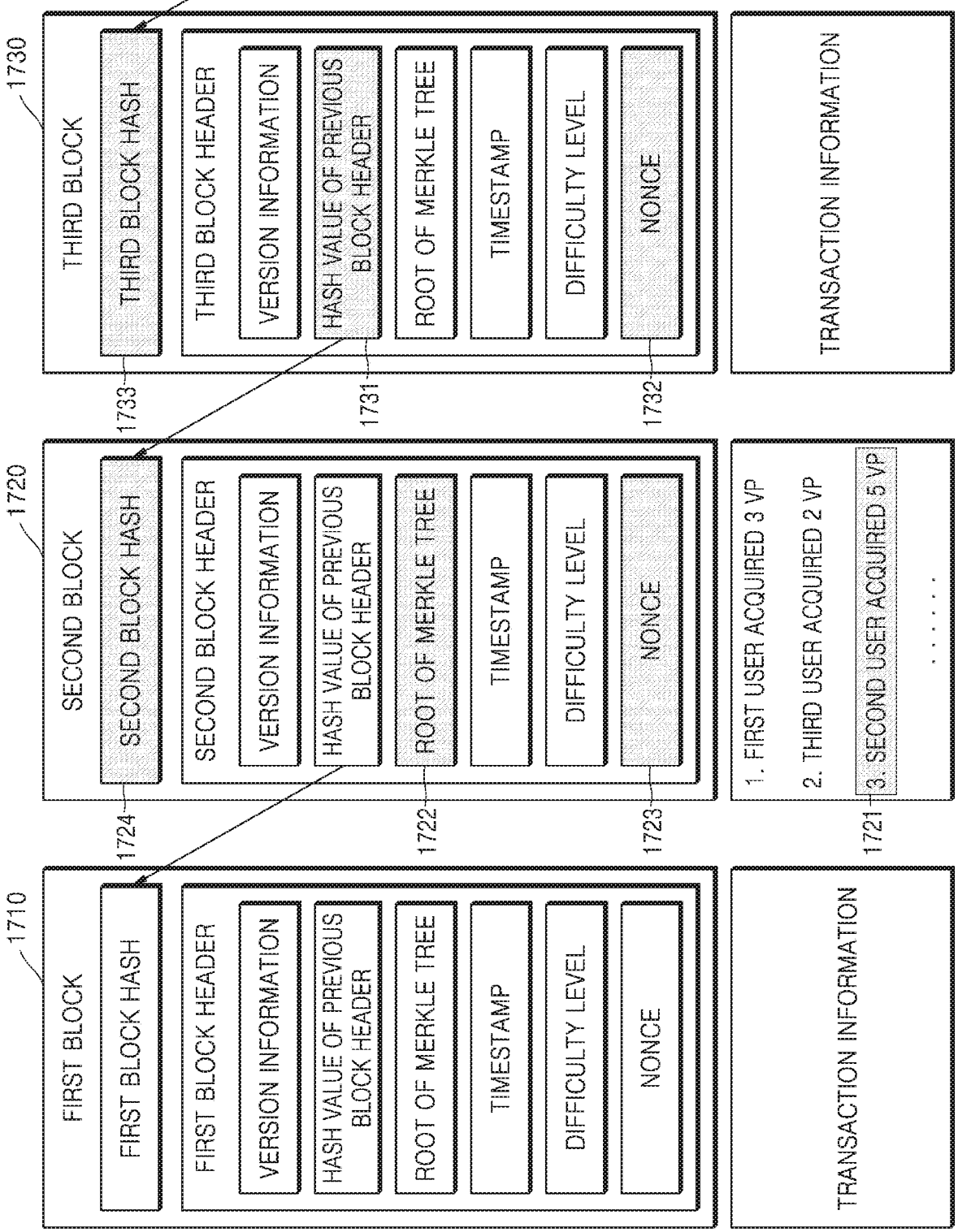
FIG. 17 is a diagram for describing the effect of increasing the consistency and security of a transaction by recording the transaction in a blockchain, according to an embodiment.

FIG. 17 is a diagram for describing the effect of increasing the consistency and security of a transaction by recording the transaction in a blockchain, according to an embodiment.

The hash value of the transaction may be used to calculate the root of the Merkle tree of the block including the transaction. Also, the root of the Merkle tree may be used to calculate the value of the block hash. The value of the block hash may be used as an input value to calculate the value of the block hash of the next block.

Particularly, the hash value of the transaction of a second block 1720 may be used as an input value to calculate the root of the Merkle tree of the second block 1720. Also, a second block hash 1724 that is a hash value of the second block header may be calculated by applying version information of the second block header, a hash value of the block header of a first block 1710, a root 1722 of the Merkle tree, a timestamp, a difficulty level, and a nonce 1723 as input values to a hash function. The second block hash 1724 may be used to calculate a hash value of a block header 1733 of a third block 1730.

Thus, as illustrated in FIG. 17, when a certain transaction 1721 among the transactions of the second block 1720 is changed, the root 1722 of the Merkle tree of the second block header may be changed. When the root 1722 of the Merkle tree of the second block header is changed, the nonce 1723 of the second block header may be changed. Because the root 1722 of the Merkle tree of the second block header and the nonce 1723 of the second block header are changed, the second block hash 1724 may also be changed. Also, as the second block hash 1724 is changed, a hash value 1731, a nonce 1732, and a third block hash 1733 of the previous block header of the third block 1730 may also be changed. That is, when the transaction recorded in the block is changed, because the root and nonce of the Merkle tree recorded in the block are changed, the hash value of the block header should be recalculated. Thereafter, the hash value of the block header of the next block should also be recalculated. Thus, while PoW is being performed from the block including the changed transaction because the transaction is changed in a certain node, blocks may be continuously added to the blockchain where the transaction is not changed in other nodes. Thus, the length of the blockchain possessed by a certain node may become smaller than the length of the blockchain possessed by other nodes.

Moreover, each of the nodes on the network of the blockchain may select the history of the transaction according to a certain criterion in order to provide consistency and security to the history of the transaction recorded in the blockchain. For example, the certain criterion may be used to select a path having the most blocks in the tree-shaped blockchain data structure. Also, the certain criterion may be used to select a path having the greatest sum in the tree-shaped blockchain data structure.

Thus, because the length of the blockchain possessing the block whose transaction has been changed is smaller than the length of the blockchain whose transaction has not been changed, each of the nodes on the network of the blockchain may select the blockchain whose transaction has not been changed, thereby ensuring the consistency and security of the transaction history recorded in the blockchain.

Figure 18:
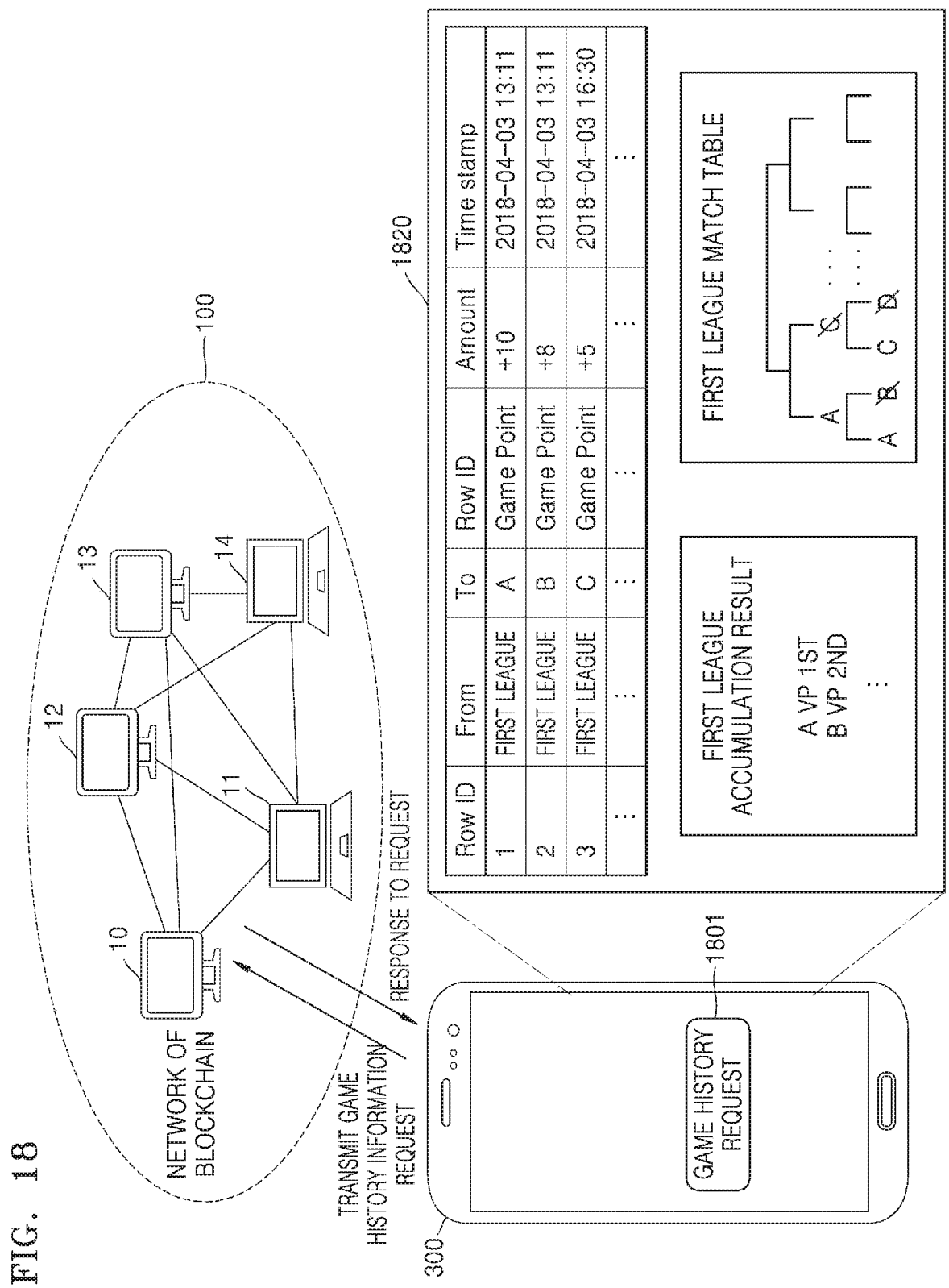
FIG. 18 is a diagram for describing that a game service providing apparatus provides game information at a user's request.

FIG. 18 is a diagram for describing that a game service providing apparatus 200 provides game information at a user's request.

Referring to FIG. 18, game information may be provided to the user device 300 based on game history information 1820 according to a game history request 1801 of the user device 300. The user may request all information stored in the blockchain network 100 to read the game history, and in response to the request, the blockchain network 100 may provide at least a portion of the entire game history information 1820 that is accumulated information of the first game information that is the result of the game between the first user and the second user.

According to an embodiment, the game service providing apparatus 200 may be configured to provide only the game history about the first league to which the user belongs, from the blockchain network 100 in response to the request of the user device 300. Also, the game service providing apparatus 200 may provide, from the blockchain network 100, first game history information of the game performed immediately before in response to the request of the user device 300 after the end of the game of the user device 300.

FIG. 19 is a diagram for describing that a game service providing apparatus 200 provides game information at a user's request.

According to an embodiment, the game service providing apparatus 200 may provide the game status of all the leagues in response to the request of the user device 300. The game service providing apparatus 200 may provide, to the blockchain network 100, the first place of the first league and the first place of the second league based on the first game history information updated in real time. Also, based on the information stored in the blockchain network 100, the game service providing apparatus 200 may display both the victory point of A that is currently the first place of the first league and the victory point of K that is the first place of the second league.

According to an embodiment, because the consistency and security of the history of the transaction recorded in the blockchain network 100 are ensured, the user may be provided with reliable game history information.

The apparatuses described above may be implemented as hardware components, software components, and/or a combination of hardware components and software components. For example, the apparatuses and components described in the embodiments may be implemented by using one or more general-purpose computers or special-purpose computers such as processors, controllers, arithmetic logic units (ALUs), digital signal processors, microcomputers, field programmable gate arrays (FPGAs), programmable logic units (PLUs), microprocessors, or any other apparatuses capable of executing and responding to instructions. The processor may execute an operating system (OS) and one or more software applications that are executed on the OS. Also, the processor may access, store, operate, process, and generate data in response to execution of the software. For convenience of understanding, the processor may be described as being used singly; however, those of ordinary skill in the art will understand that the processor may include a plurality of processing elements and/or a plurality of types of processing elements. For example, the processor may include a plurality of processors or one processor and one controller. Also, other processing configurations such as parallel processors may also be possible.

The software may include computer programs, code, instructions, or a combination of one or more thereof and may configure the processor to operate as desired or may instruct the processor independently or collectively. In order to be interpreted by the processor or to provide instructions or data to the processor, software and/or data may be permanently or temporarily embodied in any type of machine, component, physical apparatus, virtual equipment, computer storage medium or apparatus, or transmitted signal wave. The software may be distributed over a network-coupled computer system to be stored or executed in a distributed manner. The software and data may be stored on one or more computer-readable recording mediums.

The method according to an embodiment may be embodied in the form of program instructions executable through various computer means, which may be recorded on a computer-readable recording medium. The computer-readable recording medium may include program instructions, data files, and data structures either alone or in combination. The program instructions recorded on the computer-readable recording medium may be those that are especially designed and configured for the embodiment, or may be those that are known and available to those of ordinary skill in computer software. Examples of the computer-readable recording medium include magnetic media such as hard disks, floppy disks, and magnetic tapes, optical media such as CD-ROMs and DVDs, and magneto-optical media such as floptical disks, and hardware apparatuses such as ROMs, RAMs, and flash memories particularly configured to store and execute program instructions. Examples of the program instructions may include not only machine language code generated by a compiler but also high-level language code that may be executed by a computer by using an interpreter or the like. The hardware apparatus described above may be configured to operate as one or more software modules in order to perform the operation of an embodiment, and vice versa.

While the present disclosure has been described with reference to the drawings and particular embodiments, those of ordinary skill in the art may make various changes and modifications therein without departing from the spirit and scope of the present disclosure. For example, the described technologies may be performed in a different order than the described method, and/or the described components such as systems, structures, apparatuses, and circuits may be united or combined in a different form than the described method or may be replaced or substituted by other components or equivalents thereof.

Therefore, other implementations, other embodiments, and equivalents of the following claims are also within the scope of the following claims.

The invention claimed is:

1. A method of recording a game result of a game played between a plurality of users, the method comprising:
registering the plurality of users including a first user and a second user in a blockchain network;
performing, by the first user and the second user, a game according to execution of a first game application;
obtaining, from the first game application, first game result information as a game result of the game played between the first user and the second user; and
updating game history information of the blockchain network based on the first game result information,
wherein the obtaining of the first game result information as the game result of the game played between the first user and the second user comprises receiving a confirmation of the first user and a confirmation of the second user with respect to the first game result information.

2. The method of claim 1, further comprising updating a match table of league games by using the game history information of the blockchain network.

3. The method of claim 1, further comprising assigning the plurality of registered users in a plurality of league games based on information about the plurality of users registered in the blockchain network before the performing of the game.

4. The method of claim 1, further comprising rewarding a cryptocurrency corresponding to a victory point (VP) acquired in the game to the first user based on at least one of the first game result information and the game history information.

5. The method of claim 1, wherein the updating of the game history information based on the first game result information by using the blockchain comprises:
requesting a first node on a network of the blockchain to record the first game result information in a block constituting the blockchain for verification of the first game result information; and
updating the game history information based on the first game result information by receiving a message indicating that the first game result information has been verified from the network of the blockchain.

6. The method of claim 5, wherein the requesting of the first node to record the first game result information comprises encrypting the first game result information and transmitting the encrypted first game result information to the first node.

7. The method of claim 6, wherein the transmitting of the first game result information to the first node comprises:
generating a first hash value corresponding to first transaction information by applying the first game result information to a hash function for generating unique data about the first game result information;
generating a first cryptogram representing a digital signature of the first game result information by encrypting the first hash value with a private key of the first user; and
transmitting the first cryptogram with the first game result information to the first node.

8. The method of claim 1, wherein the updating of the game history information based on the first game result information comprises transmitting the first game result information to a plurality of nodes in the blockchain.

9. The method of claim 1, wherein the first game result information includes at least one of address information of a first account of the first user, address information of a second account of the second user, a victory point acquired by the first user in the game, a victory point acquired by the second user in the game, game play time information of the game, and information proving whether the result of the game is confirmed.

10. The method of claim 1, further comprising controlling to store a program code of a smart contract in the blockchain network for organizing a plurality of leagues according to levels of the plurality of users and rewarding a winner of a league.

11. The method of claim 1, further comprising updating a first account of the first user and a second account of the second user, based on the first game result information and game history information accumulated based on the first game result information.

12. A non-transitory computer-readable recording medium that stores a program that, when executed by a computer, performs the method of claim 1.

13. An apparatus recording a game result of a game played between a plurality of users, the apparatus comprising:
a communicator;
a memory storing one or more instructions; and
a processor configured to execute the one or more instructions stored in the memory, wherein the processor executes the one or more instructions to:
register the plurality of users including a first user and a second user in a blockchain network;
perform, by the first user and the second user, a game according to execution of a first game application;
obtain, from the first game application, first game result information as a game result of the game played between the first user and the second user; and
update game history information of the blockchain network based on the first game result information,
wherein the processor is further configured to:
receive a confirmation of the first user and a confirmation of the second user with respect to the first game result information.

14. The apparatus of claim 13, wherein the processor is further configured to update a match table of league games by using the game history information of the blockchain network.

15. The apparatus of claim 13, wherein the processor is further configured to assign the plurality of registered users in a plurality of league games based on information about the plurality of users registered in the blockchain network before the performing of the game.

16. The apparatus of claim 13, wherein the processor is further configured to reward a cryptocurrency corresponding to a victory point (VP) acquired in the game to the first user based on at least one of the first game result information and the game hi story information.

17. The apparatus of claim 13, wherein the processor is further configured to:
request a first node on a network of the blockchain to record the first game result information in a block constituting the blockchain for verification of the first game result information; and
update the game history information based on the first game result information by receiving a message indicating that the first game result information has been verified from the network of the blockchain.

18. The apparatus of claim 17, wherein the processor is further configured to:
encrypt the first game result information and transmit the encrypted first game result information to the first node;
generate a first hash value corresponding to first transaction information by applying the first game result information to a hash function for generating unique data about the first game result information;
generate a first cryptogram representing a digital signature of the first game result information by encrypting the first hash value with a private key of the first user; and
transmit the first cryptogram with the first game result information to the first node.

* * * * *